(12) United States Patent
Morita et al.

(10) Patent No.: US 7,412,581 B2
(45) Date of Patent: Aug. 12, 2008

(54) PROCESSOR FOR VIRTUAL MACHINES AND METHOD THEREFOR

(75) Inventors: Toshiyasu Morita, Redwood City, CA (US); Shumpei Kawasaki, Los Altos, CA (US)

(73) Assignee: Renesas Technology America, Inc., San Jose, CA (US)

( * ) Notice: Subject to any disclaimer, the term of this patent is extended or adjusted under 35 U.S.C. 154(b) by 262 days.

(21) Appl. No.: 10/696,716

(22) Filed: Oct. 28, 2003

(65) Prior Publication Data

US 2005/0091468 A1 Apr. 28, 2005

(51) Int. Cl.
*G06F 13/00* (2006.01)
(52) U.S. Cl. ...................................... 711/167
(58) Field of Classification Search ........................ None
See application file for complete search history.

(56) References Cited

U.S. PATENT DOCUMENTS

| | | | |
|---|---|---|---|
| 4,969,121 A * | 11/1990 | Chan et al. | 710/113 |
| 5,201,044 A | 4/1993 | Frey, Jr. et al. | |
| 5,325,375 A | 6/1994 | Westberg | |
| 5,369,757 A | 11/1994 | Spiro et al. | |
| 5,446,862 A | 8/1995 | Ohkami | |
| 5,488,711 A | 1/1996 | Hewitt et al. | |
| 5,530,958 A * | 6/1996 | Agarwal et al. | 711/3 |
| 5,581,726 A * | 12/1996 | Tanaka | 711/134 |
| 5,696,929 A | 12/1997 | Hasbun et al. | |
| 6,075,723 A * | 6/2000 | Naiki et al. | 365/185.03 |
| 6,128,627 A | 10/2000 | Mattis et al. | |
| 6,272,587 B1 | 8/2001 | Irons | |
| 6,272,607 B1 | 8/2001 | Baentsch et al. | |
| 6,332,185 B1 | 12/2001 | Kaufman et al. | |
| 6,757,201 B2 | 6/2004 | Matsuda et al. | |
| 2001/0026472 A1 | 10/2001 | Harari et al. | |
| 2001/0047480 A1 | 11/2001 | Tanimoto et al. | |
| 2002/0026566 A1 | 2/2002 | Awada et al. | |
| 2002/0051394 A1 * | 5/2002 | Tobita et al. | 365/221 |

OTHER PUBLICATIONS

IBM Technical Disclosure Bulletin, Pseudo-Dynamic Algorithm for Computer Memory Allocation, website: http://www.delphion.com, Sep. 1993, 2 pgs.

IBM Technical Disclosure Bulletin, Microprocessor Interface for Serial EEPROM Devices, website: http://www.delphion.com, Mar. 1992, 4 pgs.

* cited by examiner

*Primary Examiner*—Hyung Sough
*Assistant Examiner*—Craig E Walter
(74) *Attorney, Agent, or Firm*—Townsend and Townsend and Crew LLP

(57) ABSTRACT

Apparatus and method are described for a data processing device. The data processor includes features suitable for executing a software virtual machine. The data processor provides an instruction set that supports object-level memory protection suitable for high speed operation. Memory control logic is provided to accommodate a configuration having relatively less random access memory (RAM) as compared to re-programmable, nonvolatile memory, and to improve access to the re-programmable, nonvolatile memory.

10 Claims, 19 Drawing Sheets

PMOV.L @ (K, Rm), Rn

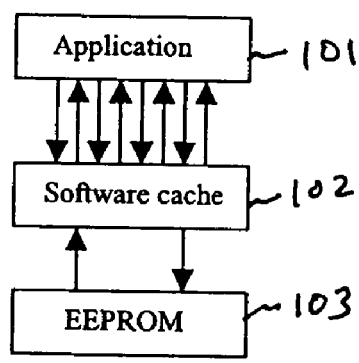
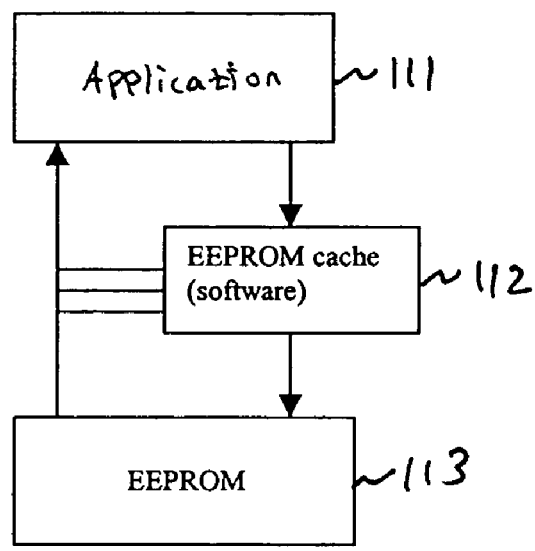
Fig.10
Fig.11

PROCESSOR FOR VIRTUAL MACHINES AND METHOD THEREFOR

BACKGROUND OF THE INVENTION

The present invention is related generally to computer processors and more specifically to computer processor enhancements suitable for virtual machines.

The notion of a virtual machine has been a topic of academic research for many years. However, the idea has been popularized by Sun Microsystems, Inc. with its Java programming language and runtime environment. The Java virtual machine is software that acts as an interface between compiled Java binary code (known as bytecode) and the underlying hardware platform (e.g., a microprocessor) that actually implements the bytecodes. Once a Java virtual machine has been provided for a platform, any Java program can run on that platform.

As the name implies, a virtual machine is an abstraction (a virtual representation) of a physical processor and typically comprises virtual counterparts of a conventional processor. For example, the Java virtual machine specifies elements such as an instruction set, a set of registers, a stack, a "garbage heap," and a method area. The real implementation of this abstract or logically defined processor is the native machine code executed by the real processor or be built into the microchip processor itself (so-called microcode).

An area in which the virtual machine is finding application is in the use of smartcards. Typically, a smartcard is a card that is embedded with either a microprocessor and a memory chip or only a memory chip with non-programmable logic. A microprocessor-based smartcard can add, delete, and otherwise manipulate information on the card, and is readily adaptable to many functions. For example, the national health card of Taiwan is a general-purpose smartcard which can store multiple programs downloaded from multiple vendors. Other examples include a credit card which can hold multiple "loyalty" applications to reward the user for multiple purchases from a single vendor, and which can also function as an employee ID card. Java Card is based on the underlying technology of the Java programming language. The Java virtual machine specification and the language definition have been accommodated to make Java technology available in a smartcard.

The present invention is motivated in part by the potential benefits of virtual machine based smartcards and, in general, by the use of virtual machine technology in resource-limited environments such as the smartcard.

For example, a smartcard typically uses three kinds of memory: ROM (read-only memory), RAM (random-access memory), and EEPROM (electrically erasable programmable read-only memory). A programming language (e.g., Java) used in a virtual machine is an abstract language and typically uses a memory model that does not recognize different kinds of memory. The translation from the abstract memory space of the virtual machine environment to the physical memory contained in or connected to the smartcard is performed by the virtual machine.

Java is an object oriented language, and thus relies heavily on the creation and destruction of objects. In an object oriented language, there are no facilities for supporting procedures (i.e., functions without an associated object), so it is not possible to do procedural programming. Therefore, it is necessary to create, destroy, and call objects to perform a given task.

Typically, smartcards have very limited RAM capacity; 2K (bytes) to 4K is common. If the programming objects are created in the limited RAM, then it becomes very difficult to perform complex tasks because the amount of memory available for object creation is very limited. A smartcard typically has much more EEPROM capacity than RAM, usually on the order of 32K to 96K of EEPROM as compared to the 2K-4K of RAM. Consequently, the virtual machine uses EEPROM for instantiation of object instance data, and uses RAM only for the Java stack and "transient RAM arrays."

The allocation of EEPROM memory for object instance data permits the creation of large programs because there is much more EEPROM capacity than RAM capacity. However, there is a substantial cost for this extra capacity. RAM typically requires one clock cycle to read or write data. EEPROM reads, likewise, typically are performed in one clock. EEPROM write operations, on the other hand, typically require about 4 mS to complete, or about 14,289 clock cycles running at 3.57 MHz! Object creation involves initialization of the data comprising the object, which require writes to the EEPROM. It can be appreciated therefore that object creation and object instance data updates is a very, very slow process.

Similarly, the virtual machine heap is allocated from EEPROM. The heap is a dynamic data structure which is constantly read and, more significantly, written. Thus, writing to dynamically allocated memory is a very slow process. Generally, any variable not on the stack will be allocated from the EEPROM heap, and so writes to non-stack variables will be very slow.

Another area of concern is in the area of providing adequate memory management. In the context of a smartcard environment, and other similarly constrained operating environments, system memory capacity is a very limited resource. Historically, limited memory capacity has always been a problem in processors, especially on multitasking systems where multiple users can run different programs simultaneously as if each user were the only person on the system. The earliest multitasking systems supported a method of multitasking memory called "swapping." This system saves the entire executing state of a low priority program to a disk, thus freeing up memory to allow another, higher priority program to execute. Swapping can also take place when a program is idle, waiting for data transfer with a slow I/O device (e.g., tape drive) to complete.

Though swapping is effective in providing access to memory, the performance is less than optimal because the entire address space of the program must be swapped to and from the disk. The idea of swapping out entire programs evolved into the notion of "paging" where the address space of a program was divided into some number of fixed-size pages. Each of these pages could then be swapped out to disk and back, as required by the system, without having to swap out the entire program thus improving system performance.

Memory protection mechanism are needed when multiple programs are executing on the processor. Memory protection via hardware instructions has traditionally been implemented in one or two different ways: The first method was via extra data bits added to each machine word. This method required special hardware and was incompatible with industry standards, and was soon discontinued in favor of memory management logic. This method relies upon a component called a memory management unit (MMU) to implement memory protection. The MMU approach provides page-level granularity, usually on the order of 4 Kbytes and higher.

Another memory management technique concerns memory access speed. The "cache" is a high-speed memory and was originally envisioned as a slave to a slower core memory in such a way that in practical cases the effective access time is nearer that of the fast memory than that of the slow memory. Caches have traditionally been used to decrease the average access time of slower RAM memory, and have also been used in mechanical storage media such as disk drives.

There is a need to provide a suitable operating environment for operating a virtual machine in a smartcard environment and in general in any similar resource-limited environment other than in a smartcard application.

SUMMARY OF THE INVENTION

The present invention describes techniques for memory access in which write operations to a memory including a re-programmable non-volatile memory are detected, if an address of the write operation from a processor logic indicates a first address area of the non-volatile memory, then performs a first write operation of data to said non-volatile memory. If the address of the write operation from the processor logic indicates a second address area of the non-volatile memory, then a second write operation of data is performed to the non-volatile memory according to a write operation speed that is different from the first write operation speed.

The present invention further provides a data processing architecture featuring memory access techniques for accessing re-programmable, non-volatile memory. In one aspect of the invention, a caching mechanism for accessing such memories is provided. In another aspect of the invention, a mechanism for writing to such memories is provided.

The present invention still further provides a memory management technique that can be adapted to enhance virtual machine implementations.

BRIEF DESCRIPTION OF THE DRAWINGS

The present invention can be appreciated by the description which follows in conjunction with the following figures, wherein:

FIGS. 8-13 show an illustrative embodiment of a caching mechanism in accordance with the present invention;

DESCRIPTION OF THE SPECIFIC EMBODIMENTS

Figure 1:
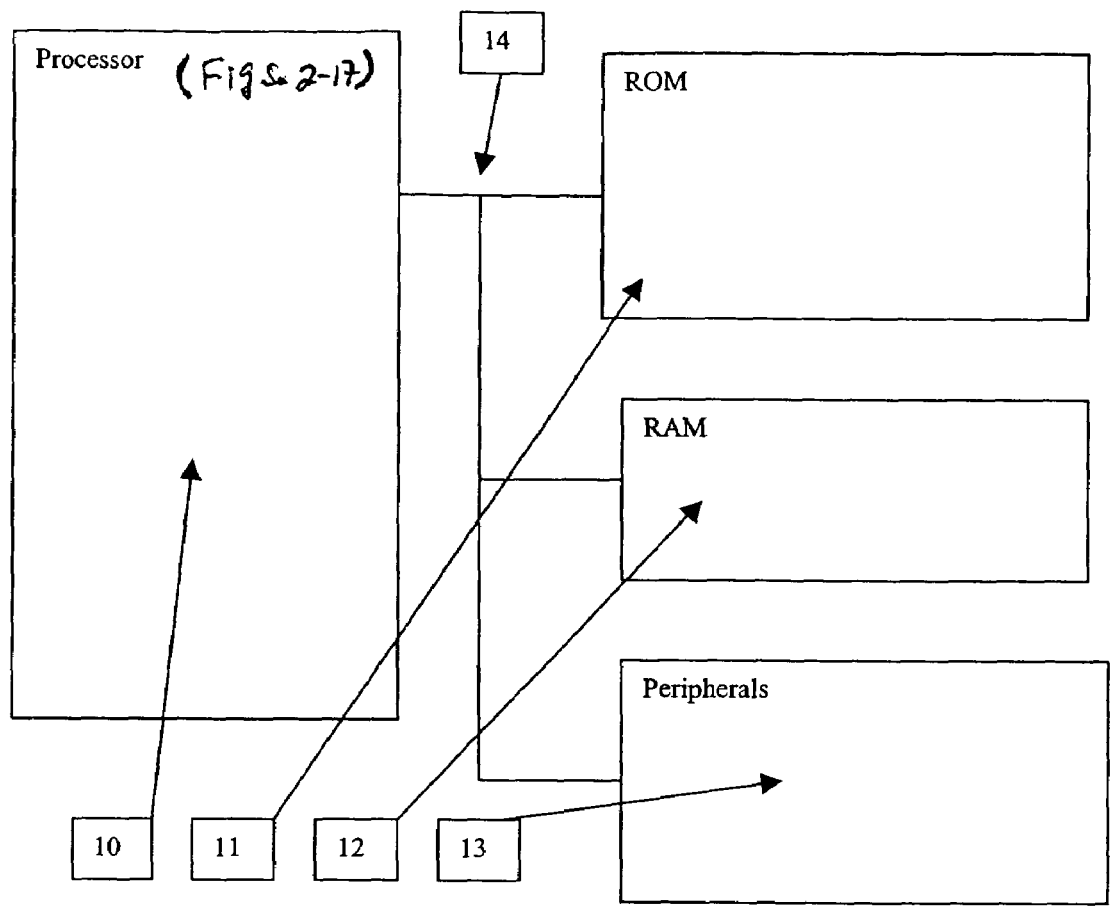
FIG. 1 shows a generalized block diagram of a system incorporating data processing aspects of the present invention.

FIG. 1 depicts an illustrative embodiment of a data processing unit 10 according to the present invention incorporated in a high-level generalized block diagram representation of a computing environment. Various aspects of the invention as embodied in the data processing unit 10 are shown in the following figures. A bus 14 is shown connecting together the data processing unit and other components. The bus 14 is a representation of the various physical connections that may be needed among the components, including but certainly not limited to a data bus, signal lines for asserting control signals among the components, power lines for providing power as needed to the components, and so on.

The components shown in FIG. 1 are typical but not exhaustive of elements in a computing environment. A read-only memory (ROM) 11 can be provided. The ROM can contain program code and data as required in a given system. A random access memory (RAM) 12 can be provided. Dynamic RAMs are commonly used for providing a transient area of storage during operation. One or more peripherals 13 can be provided as well.

Figure 2:
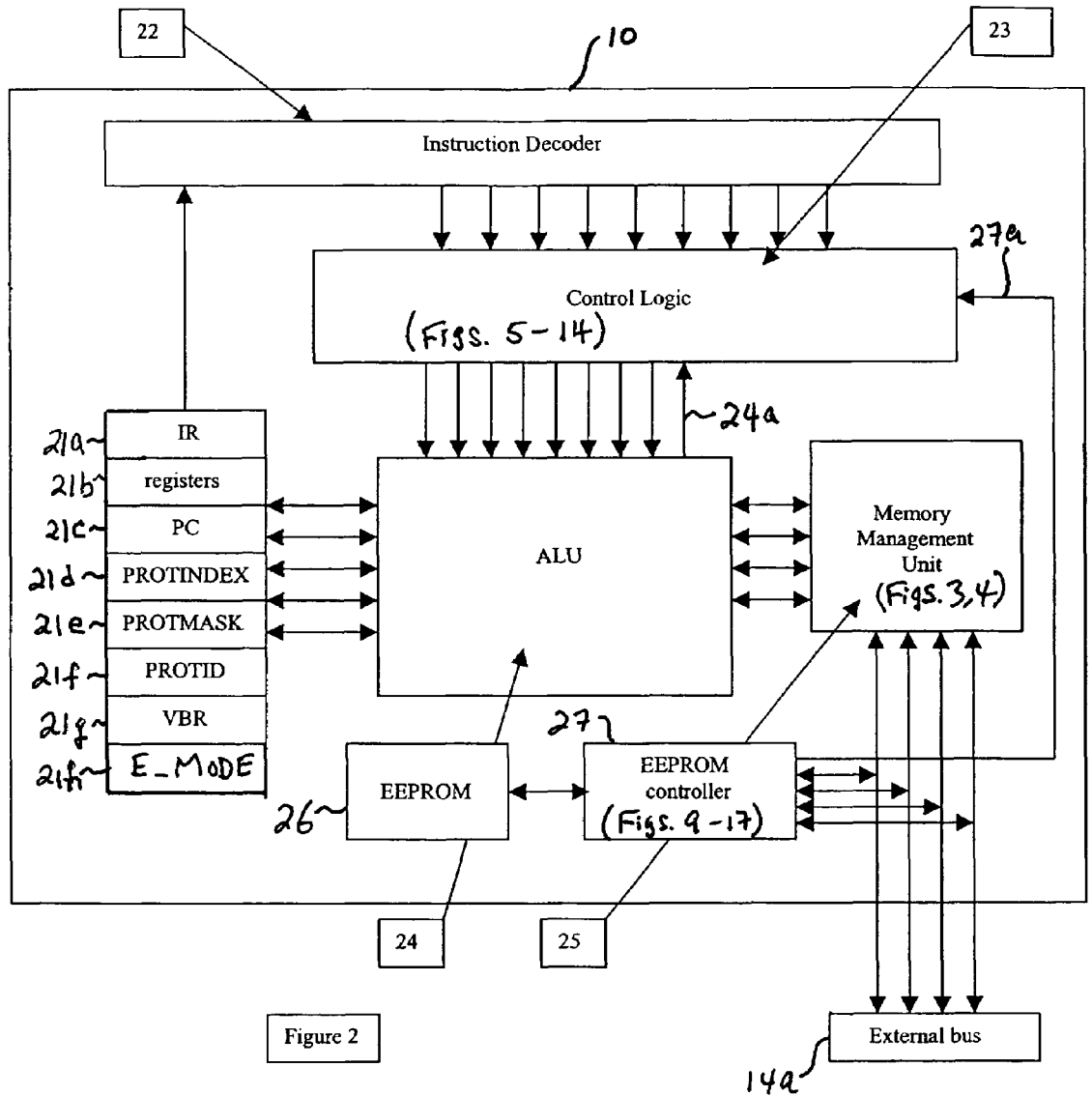
FIG. 2 represents an illustrative embodiment of a data processing unit in accordance with the present invention.

FIG. 2 is a generalized block diagram representation of an illustrative embodiment of the data processing unit 10 in accordance with the invention. The data processing unit comprises a processor logic component configured to operate in accordance with the invention. An illustrative embodiment of the processor logic can comprise an arithmetic and logic unit (ALU) 24 and control logic 23. The ALU 24 typically comprises logic configured to implement the various operations specified by the instruction set of the data processing unit. The control logic 23 typically comprises logic configured to provide various control signals to coordinate the operation of the ALU and other components to execute the instructions comprising a program. It can be appreciated the control signals are distributed by way of control signal lines, schematically represented in the figure generally as the various lines connecting the components. One such control signal is an interrupt signal 24a from the ALU provided to the control logic.

An instruction decoder component 22 comprises logic configured to receive and decode the instruction set of the data processing unit 10. The instruction decoder component produces control signals and data signals depending on the particular instruction being decoded and passes the signals, via the signal lines shown schematically in the figure, to the control logic 23 which then produces appropriate control signals to effect execution of the instruction.

The data processing unit 10 further comprises a plurality of data storage components. In a particular embodiment, the data storage components are data registers 21a-21h. For example, an instruction register 21a can be provided to store an instruction to be fed to the instruction decoder 22. A set of general purpose registers 21b can be provided for storing data. Typically, the instruction set of the data processing unit includes data manipulation instructions such as ADD, SUBTRACT, COMPARE, and the like. These instructions can use the general purpose registers 21b to store and retrieve data. A program counter 21c is a register that contains the address of the next instruction to be fetched into the instruction register 21a. FIG. 1 shows additional data storage components, namely, a PROTINDEX register 21d, a PROTMASK register 21e, a PROTID register 21f, a vector-based register (VBR) 21g, and an EEPROM_MODE register 21h. The purposes of these registers will be discussed below in the appropriate portions of the specification.

The data processing unit 10 further comprises a re-programmable, non-volatile memory. The particular embodiment illustrated in FIG. 2 shows an EEPROM memory 26 as the re-programmable, non-volatile memory. Alternative configurations can include other similar re-programmable, non-volatile memories such as flash memory. A memory controller is embodied as an EEPROM controller 27 which is configured to provide access to the EEPROM memory 26 according to the invention. It is understood that suitable control lines and internal data buses are present to interconnect the various components. Such lines are schematically represented in FIG. 2.

In addition to the EEPROM memory 26, access to an external memory (e.g., dynamic RAM) can be provided via a suitable memory bus 14a. A memory management unit (MMU) 25 constitutes an illustrative embodiment of a memory access logic component of the data processing unit 10. Memory accesses required by the ALU 24 can be handled by the MMU 25. The MMU is configured to perform address translation in accordance with the present invention. As can be seen in the embodiment shown in FIG. 2, the MMU also serves to provide access (via the EEPROM controller 27) to the EEPROM memory 26.

Figure 3:
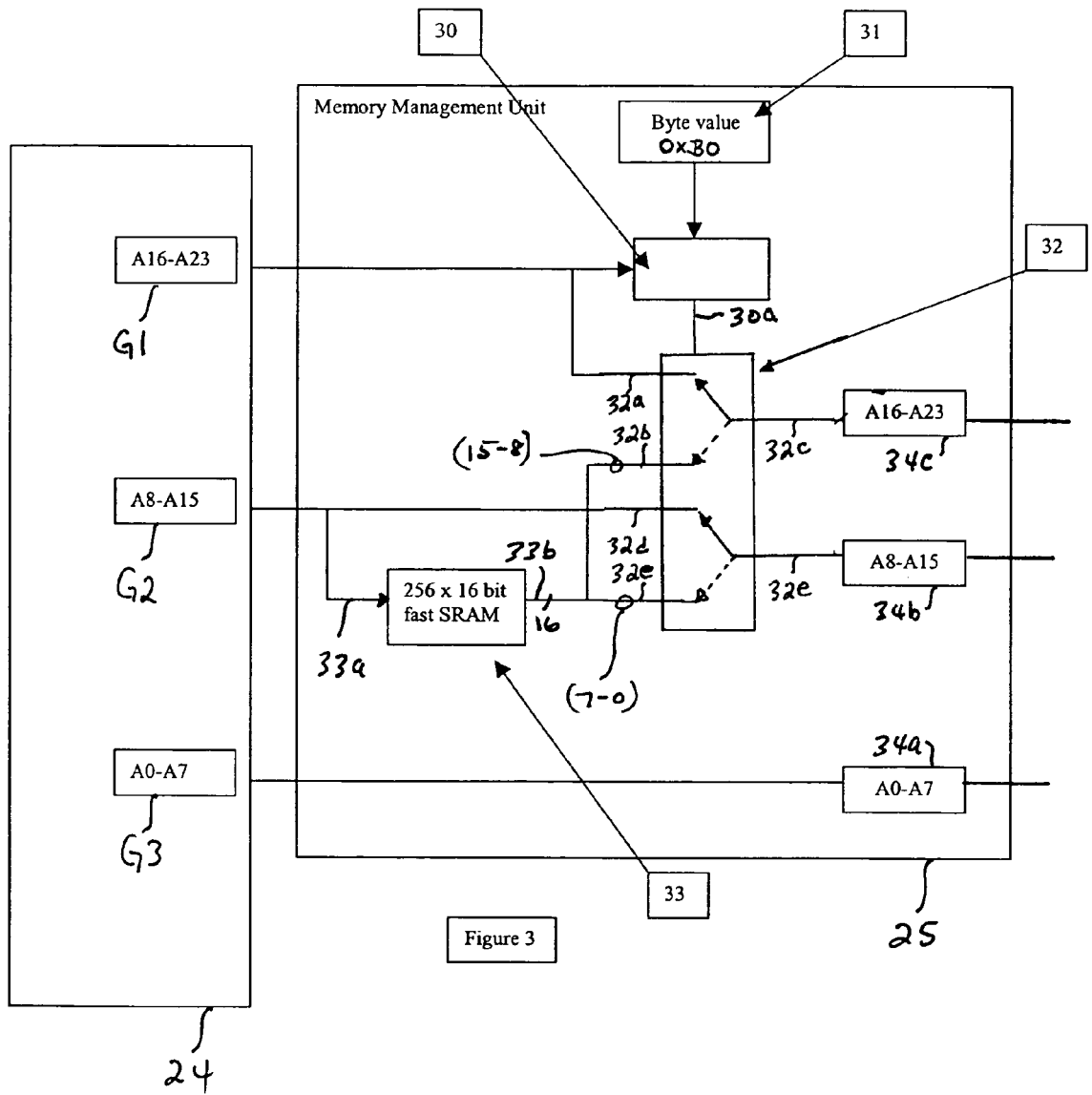
FIG. 3 shows an illustrative embodiment of memory access in accordance with the present invention.

FIG. 3 is a schematic representation of an illustrative embodiment of the MMU 25 in accordance with the invention. As indicated in the figure, a 24-bit addressing scheme is used in a particular embodiment of the data processing unit 10. It can be appreciated of course that other address sizes can be easily accommodated in accordance with the invention.

FIG. 3 shows that address signals from the ALU 24 are provided to the MMU 25. In a particular embodiment, this can be accomplished by providing address lines from the ALU to the MMU. The MMU provides address signals to the memory bus 14a shown in FIG. 2 which in a particular embodiment can comprise MMU address lines 34a-34c being coupled to the memory bus.

The MMU 25 comprises a data store 31 to provide a value. In the embodiment shown, a value of 0×B0 is provided. The value from the data store 31 is provided to a comparator 30. The comparator performs a comparison of the value from the data store 31 against a subset of the address bits. In the embodiment illustrated, the uppermost 8-bits of the 24-bit address ($A_{23}$-$A_{16}$) are compared by the comparator 30. An output signal 30a of the comparator is used to control a data switch 32 which, in a particular embodiment of the invention, can be a suitably configured multiplexer.

The MMU 25 further comprises a data translation table component 33. The data table is configured to produce an output value 33b based on an input value 33a. In a particular embodiment of the invention, another subset of the address bits serves as the input to the data table 33, namely, address bits $A_{15}$-$A_8$. The output 33b of the data table is a 16-bit value provided over 16 bitlines. The 16 bitlines can be divided into upper 8 bits and lower 8 bits.

Address lines representing address bits $A_{23}$-$A_{16}$ are provided to an input 32a of the data switch 32. The upper 8 bits from the data table component 33 are provided to an input 32b of the data switch. The data switch is configured to provide the input 32a to its output 32c when the comparator output signal 30a is in a first data state. The data switch is configured to provide the input 32b to the output 32c when the comparator output signal is in a second data state.

Address lines representing address bits $A_{15}$-$A_8$ are provided to an input 32d of the data switch 32. The lower 8 bits from the data table component 33 are provided to an input 32e of the data switch. The data switch is configured to provide the input 32d to its output 32f when the comparator output signal 30a is in a first data state. The data switch is configured to provide the input 32e to the output 32f when the comparator output signal is in a second data state.

The MMU 25 is configured to pass still a third subset of address bits directly to the MMU address lines 34a, namely, address bits $A_7$-$A_0$.

Figure 3A:
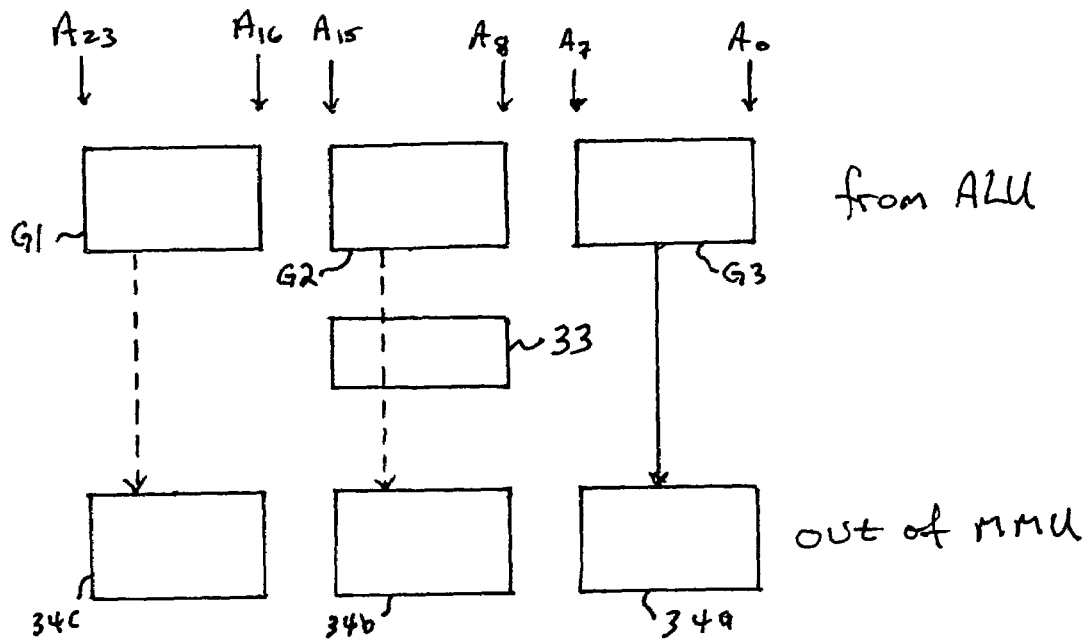
FIG. 3A illustrates a memory mapping according to an aspect of the invention as embodied in FIG. 3.

FIG. 3A illustrates the operation when there is no address translation. When the uppermost 8 bits of the address ($A_{23}$-$A_{16}$) from the ALU 25 does not contain the value 0×B0, the comparator 30 is configured to place the comparator output signal 30a in the first data state. Consequently, the data switch 32 simply passes the address lines $A_{23}$-$A_8$ from the ALU 25 directly to the MMU address lines 34c and 34b. The address lines $A_7$-$A_0$ are always passed directly to the MMU address lines 34a. Consequently, no address translation occurs. This is shown in FIG. 3A by the dashed lines.

Figure 3B:
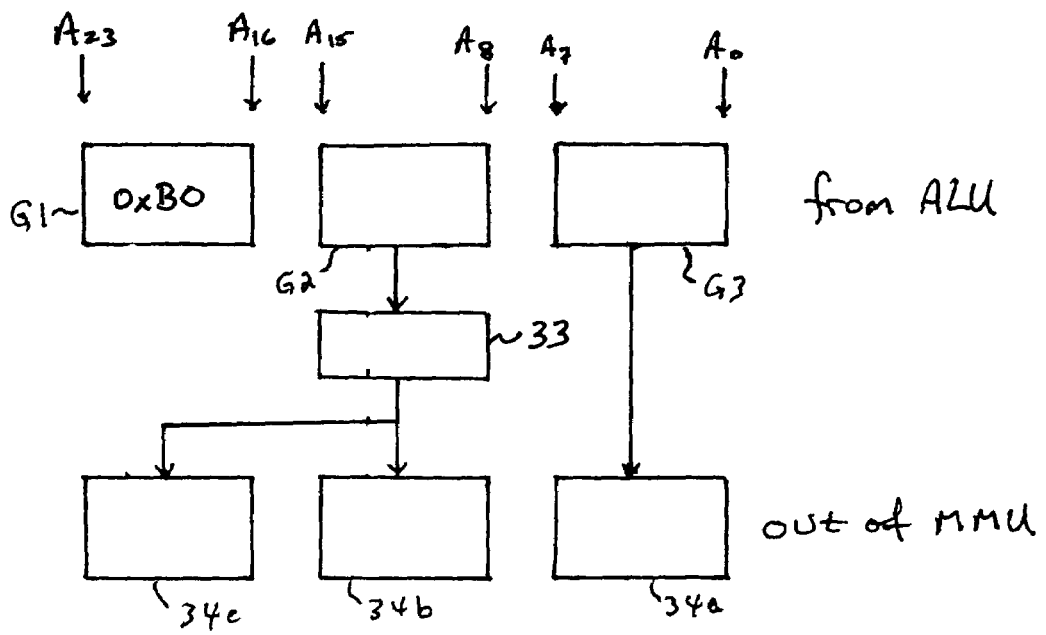
FIG. 3B illustrates a memory mapping translation operation according to an aspect of the invention.

FIG. 3B illustrates the translation operation of the MMU 25. When the uppermost 8 bits of the address ($A_{23}$-$A_{16}$) from the ALU 25 does contain the value 0×B0, the comparator 30 is configured to place the comparator output signal 30a in the second data state. Consequently, the data switch 32 passes the output lines 15-8 from the data table 33 to the MMU address lines 34c. Similarly, the output lines 7-0 from the data table are passed to the MMU address lines 34b. The address lines $A_7$-$A_0$ again are passed directly to the MMU address lines 34a.

Figure 4:
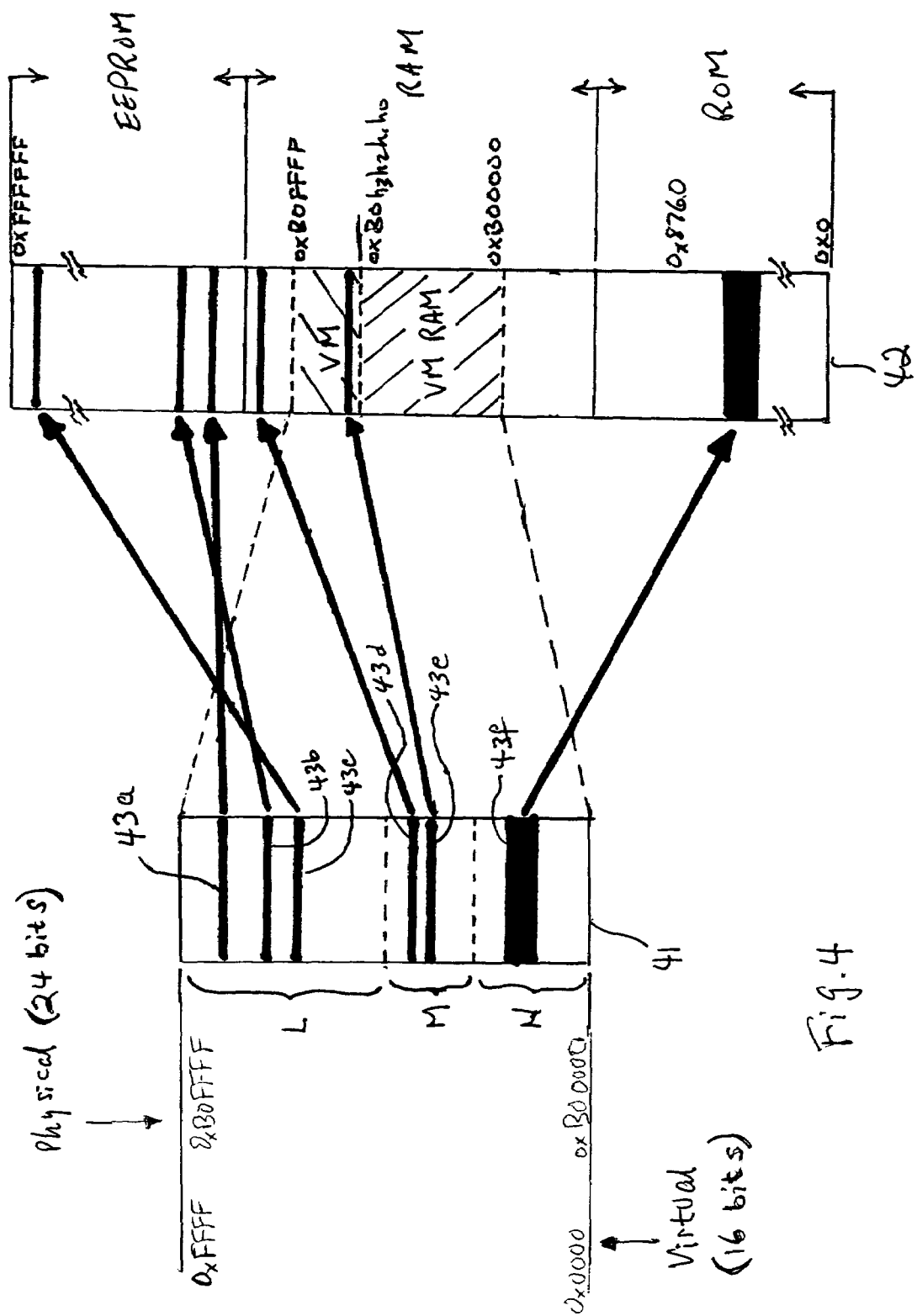
FIG. 4 shows a memory map exemplar according to an aspect of the invention as embodied in FIG. 3.

FIG. 4 shows a memory map exemplar illustrating a mapping from non-contiguous physical memory to a continuous memory space that can be provided by the MMU 25. FIG. 4 also shows how this mapping scheme can be applied to provide the address space for a virtual machine. First, a discussion of the mapping. The figure shows a memory map 42 of physical memory. The physical memory comprises three kinds of memory: an EEPROM, a RAM, and a ROM. The address space of the physical memory, which in this particular implementation is 24 bits, is partitioned among the three kinds of memory. In the exemplar shown in the FIG. 4, the ROM occupies the low order address space and the EEPROM occupies the high order address space, allocating RAM memory to the middle portion of the address space. A 64K fragment 41 of the physical memory is shown enlarged. The address space of the memory fragment extends from 0×B0FFFF to 0×B00000.

Consider the MMU detail shown in FIG. 3. When an address (say, 0×8760) is provided from the ALU 24 to the MMU 25, it can be seen that the MMU will simply pass this address to the bus 14a (FIG. 2) unchanged, to access the content of memory location 0×8760 for a write operation or a read operation. Incidentally, for the particular example shown, memory location 0×8760 is in ROM, so the access is likely to be a read operation.

Now, consider when the ALU 24 provides an address, say 0×B0$b_3b_2b_1b_0$, where $b_n$ is a 4-bit value. The MMU 25 will map that address to another address having the form 0×$N_3N_2N_1N_0b_1b_0$, where $N_n$ is a 4-bit value. As can be seen in FIG. 3, the low o (0×$b_1b_0$) are passed through. However, the data table 33 will provide a new 16-bit value (0×$N_3N_2N_1N_0$) to replace the original 16-bit value (0×B0$b_3b_2$) that came from the ALU. Moreover, the new 16-bit value is selected based on the middle 8 bits (0×$b_3b_2$). Thus, the MMU can map each of the 256 contiguous 256-byte pages comprising the 64K memory fragment 4, to any 256-byte page in the physical memory 42 falling on a two-byte boundary. For example, the 256-byte page 43a is shown mapped to a 256-byte page in physical memory, which can be any page in the physical memory address space subject to the page boundary constraint. The same holds true for the other 256-byte pages comprising the fragment 41. The segment 43*f* shows that a contiguous collection of two or more 256-byte pages can mapped to another area of physical memory of the same size, highlighting the idea that it is not necessary to scatter each 256-byte page all over the physical address space.

If the data store 31 which supplies the constant value 0×B0 is changed, then a different 64K fragment can be mapped. It is noted that a 256-byte page in the fragment 41 can be mapped to itself, or to another 256-byte page within the fragment 41. It can be seen that the contents of the data table (translation table) 33 determine the mapping function.

Thus, memory control logic embodied in accordance with the present invention, such as MMU 25, has the interesting ability to partition a contiguous portion of its physical memory address space into plural segments and to map each such segment to an equal-sized segment anywhere in its physical memory. In other words, the MMU can provide address translation for only a subset of the address space. It can be seen that the 256-byte page size granularity can be varied to be any page size, from one byte granularity to something larger (e.g., another typical page size might be 128 bytes). Referring to FIG. 3, the page size can be varied in the MMU by regrouping the address lines $A_{23}$-$A_0$ (from the ALU).

Merely as an illustration, consider an extreme (and unlikely) example where the MMU is reconfigured in the following manner (referring to FIG. 3):

the G2 address lines consist of $A_{15}$ and $A_2$ instead of $A_{15}$-$A_8$ and the G3 address lines consist of $A_1$ and $A_0$ instead of $A_7$-$A_0$ (4-byte pages).

The data table 33 would provide 4048 ($2^{14}$) 22-bit values, allowing the MMU to map each of 4048 4-byte "pages" contained in a 64K block to any other 4-byte page in the physical memory, with the constraint that the map 4-byte page falls on a 4-byte boundary.

In accordance with another implementation, the number of G1 address lines can be increased or decreased in number to vary the possible locations of the fragment 41. As shown in FIG. 3, the G1 address lines comprise the upper 8 bits of a 24 bit address space. As shown, the MMU 25 of FIG. 3 limits the fragment 41 to be on a 64K boundary. It can be appreciated, however, that numerous other permutations can be made to the address lines provided to the MMU to achieve various effects.

Consider once again the memory map of FIG. 4, this time with the notion of a virtual machine in mind. The figure shows that a virtual machine monitor component VM is loaded into the memory, and in particular in the RAM memory. The VM occupies the physical address space from 0×B0FFFF to (0×B0$h_3h_2h_1h_0$+1). A virtual machine RAM memory (VM RAM) occupies the address space from 0×B0$h_3h_2h_1h_0$ to 0×B00000. This configuration gives the virtual machine a virtual address space of 64K which occupies the physical address space from 0×B0FFFF to 0×B00000. The memory fragment 41 therefore represents the virtual address space of the virtual machine. The address range shown in the far left portion of FIG. 4 represents the virtual address range 0×FFFF to 0×0000 of the virtual machine.

When the virtual machine is initialized, one of the initialization routines performs an initialization of a translation table. Thus, in an embodiment of this aspect of the present invention, the translation table is a data storage component (e.g., data translation table 33) in the data processing unit 10 that has an associated address within the physical address space of the data processing unit. The MMU 25 is configured to recognize this address and perform the requested I/O with the table. Thus, the following code fragment exemplar can be used to initialize the table as part of the initialization sequence of the virtual machine:

```
void VM__init( )
{
    for( i = ROM__START; i < ROM__END; ++i )
        translate[i] = &ROM[i];
    for( i = RAM__START; i < RAM__END; ++i )
        translate[i] = &RAM[i];
}
``` where ROM[ ] and RAM[ ] are arrays which hold the mapping of each virtual page to a physical page, and translate[ ] is the translate table 33.

Operation of the virtual machine amounts to execution, by the data processing unit 10, of the code which implements the virtual machine monitor stored in the physical memory 42 between 0×B0FFFF and (0×B0$h_3h_2h_1h_0$+1). An applet to be executed by the virtual machine is loaded into the VM RAM area. When the data processing unit executes the virtual machine code, address references are addresses in the physical memory address space 42 of 0×FFFFFF–0×0. However, when the virtual machine "executes" the applet code, address references are addresses in the virtual memory address space of 0×FFFF–0×0. The virtual machine code must perform a translation of the virtual address into a real address.

The virtual machine includes functionality to perform translations of a virtual address to a physical address. The following code fragment can be used:

```
char VM__read__byte(unsigned int addr)
{
    char *p = (char *)((addr & 0xff)|(translate[addr >> 8]));
    return (*p);
}
```

Figure 4A:
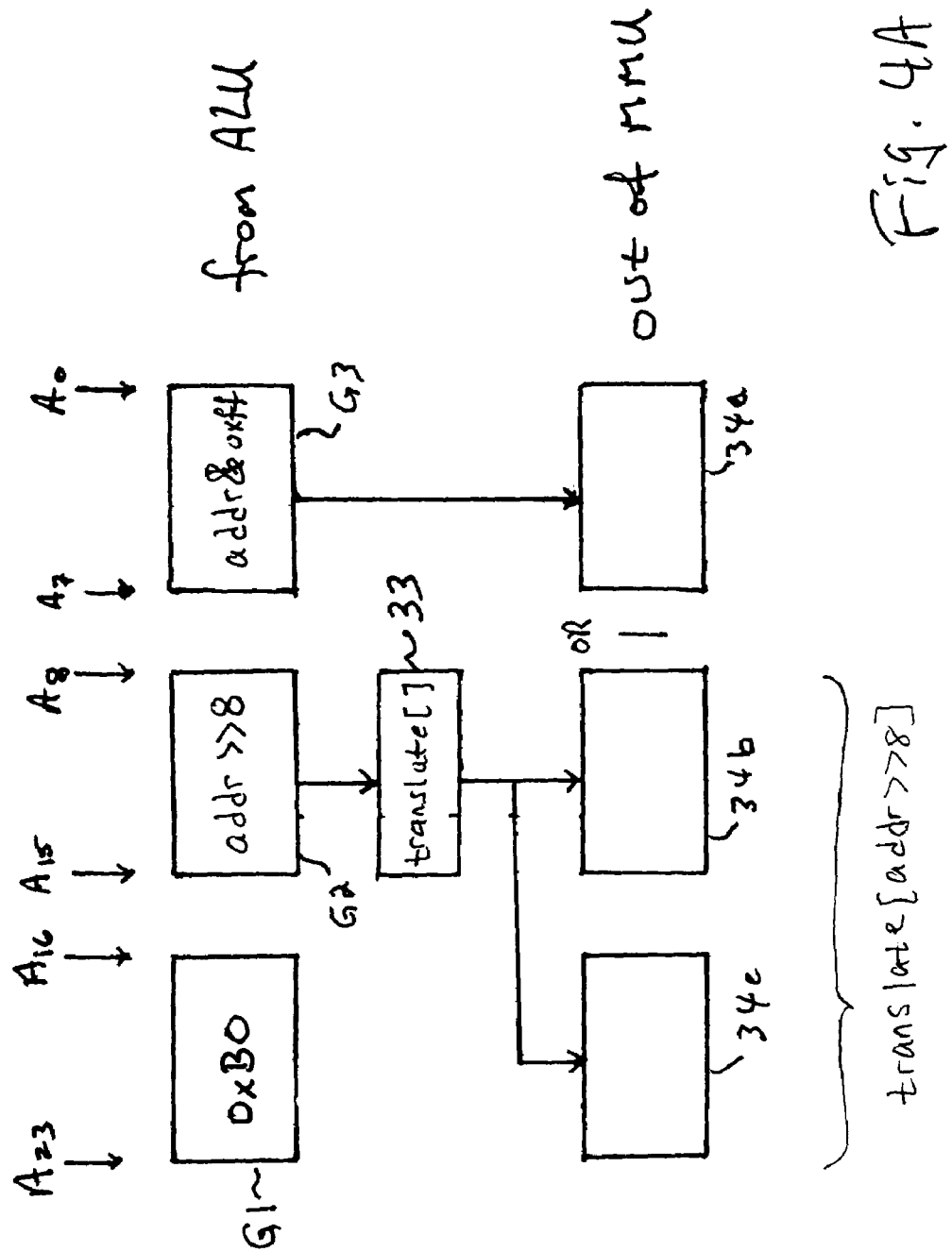
FIG. 4A is a graphic illustration of the mapping process.

This subroutine is executed in the physical address space and will return a value representing an address in the physical address space 42. Since the VM executes in a 24-bit address space where the addresses begin with 0×B0, The MMU 25 will resolve the address reference:

((addr & 0xff)|(translate[addr >>8]))

in accordance with the mapping discussed above. FIG. 4A illustrates this mapping process graphically.

Figure 5:
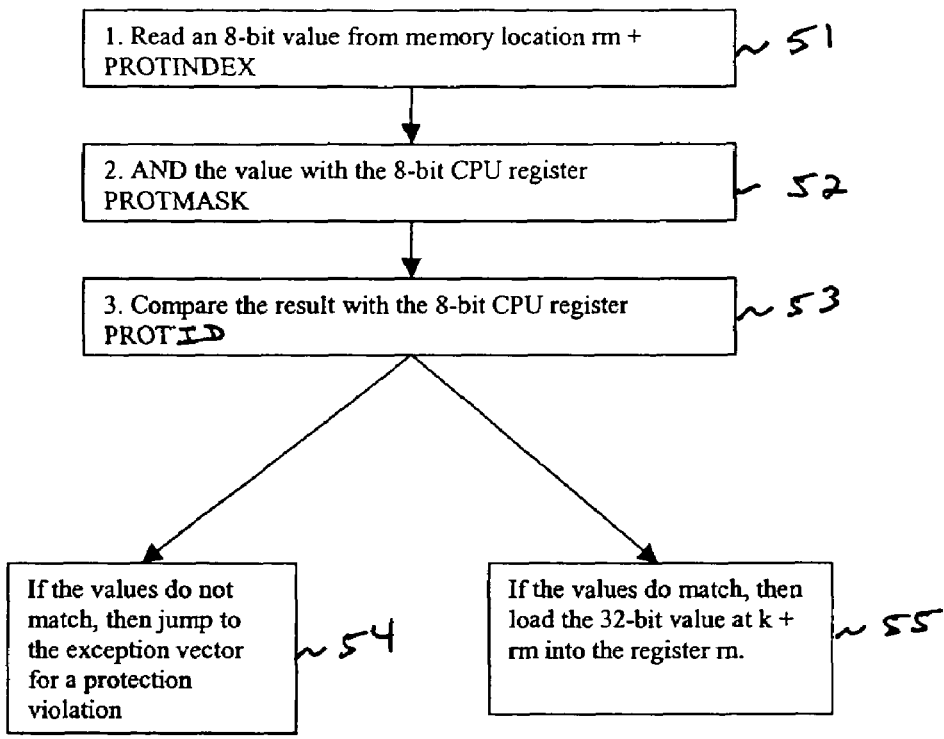
FIGS. 5, 5A, and 6 show an embodiment of a read access operation in accordance with the present invention.
Figure 5A:
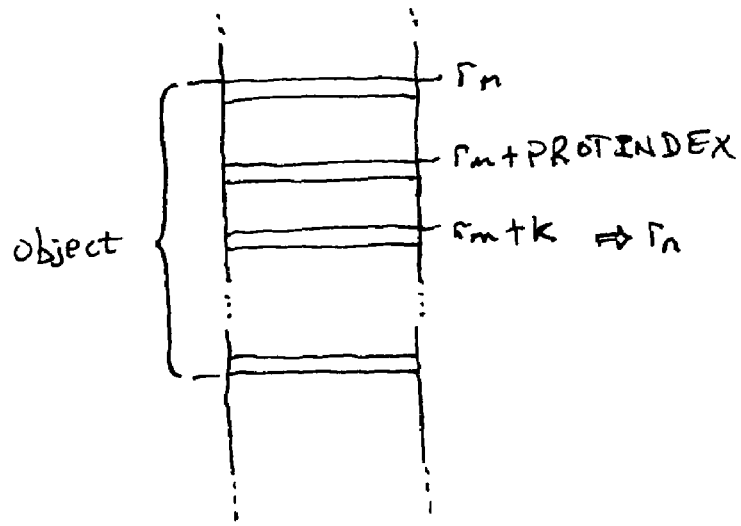
Figure 6:
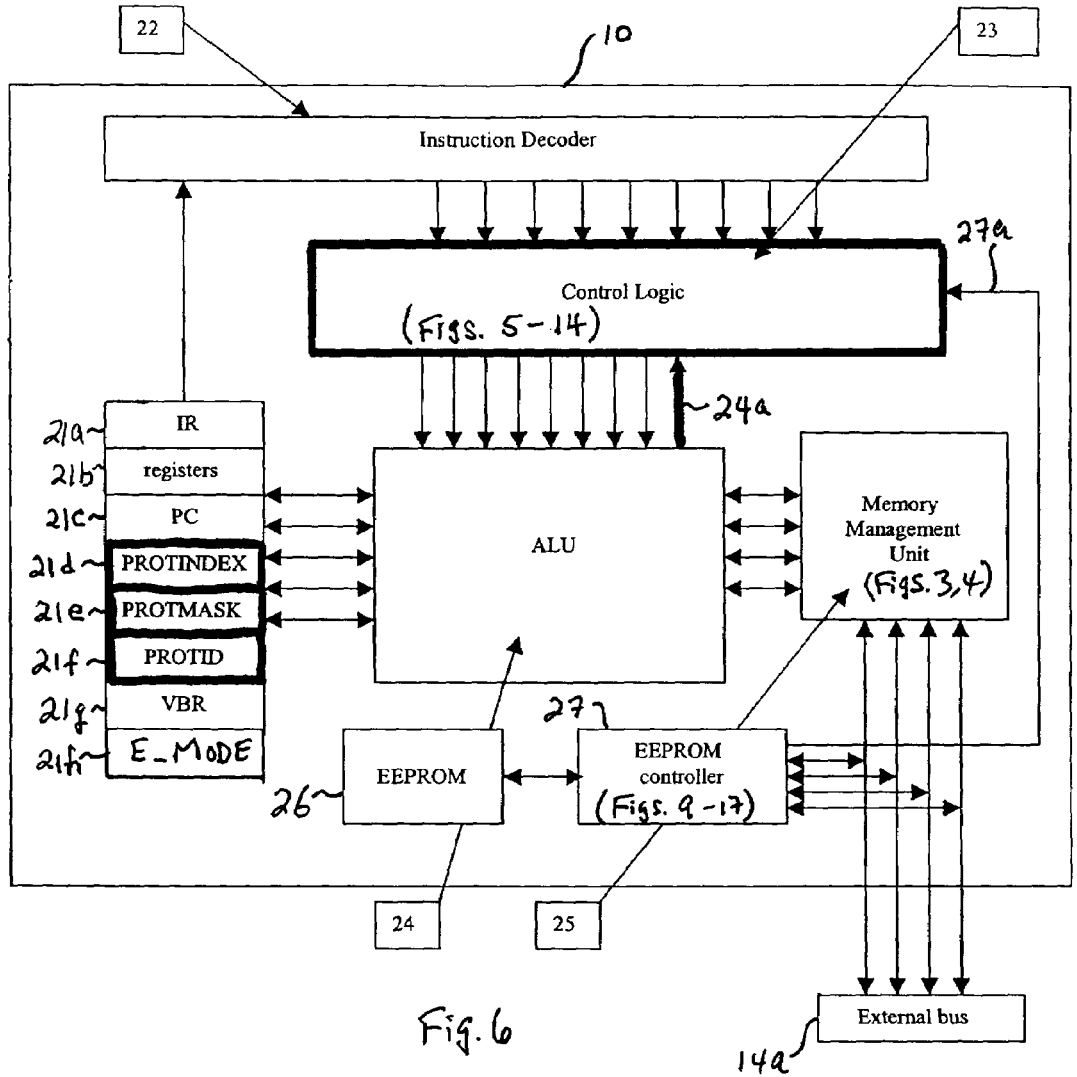

FIGS. 5, 5A, and 6 illustrate a particular embodiment for reading data in accordance with another aspect of the present invention. FIG. 5 highlights the control sequence for effecting a protected read operation according to the invention. FIG. 6 highlights (with heavy lines) the components of the data processing unit 10 shown in FIG. 2 that participate in the read operation. FIG. 5A illustrates schematically the operation of the PMOV instruction on an object.

An instruction exemplar in accordance with this aspect of the invention can be represented by the following assembly code formatted instruction:

PMOV .L @(K, $R_m$), $R_n$ where:

PMOV is a mnemonic for the data transfer instruction;

.L is indicative of the size (or number) of data elements (e.g., bytes) to be transferred;

(K, $R_m$) represents a source address formed by adding K to the contents of register $R_m$;

$R_m$ is a pointer to the object (FIG. 5A);

$R_n$ is the destination register; and the @ sign is conventional notation for indirect addressing.

It can be appreciated of course, that this instruction exemplar is merely illustrative and is useful for explaining this aspect of the invention. However, one of ordinary skill in the relevant art will readily appreciate that there are myriad possible variations of the instruction. For example, the data size can be specified differently. The amount of data involved in the transfer can be any appropriate size; e.g., the ".L" qualifier typically specifies the number of bytes to be transferred. Other qualifiers such as ".B", ".W", and so on can be provided. More generally, a PMOV instruction can be provided which performs block-level transfers (e.g., 256 bytes), if desired. Alternate addressing modes can be provided. Here, indirect addressing is provided only for the source; however, the destination can also be indirectly addressed. As implied, the first operand is the source operand and the second operand specifies a destination. Of course, the operands can be reversed.

When the instruction decoder 22 decodes the above PMOV instruction, signals corresponding to the decoded instruction are provided to the control logic 23 to effect the read operation. In a particular embodiment of this aspect of the invention, the control logic 23 is configured to assert control signals to perform the sequence of actions shown in FIG. 5. First, in a step 51, the ALU 24 is controlled to fetch the value contained in the register $R_m$. This is the address of the object from which the datum will be read. The value contained in the data storage component PROTINDEX 21d is added to the address from $R_m$ to obtain a second address. The second address is provided to the MMU 25, where it may be translated into another address. The address provided by the MMU is then used to retrieve the content contained in the addressed memory location. Recall from the discussion above, that the addressed memory location can be anywhere in the memory space of the data processing device. In the particular embodiment of this aspect of the invention, the content retrieved is an 8-bit value which is provided to the ALU 24.

In a step 52, the ALU 24 is then controlled to fetch the value contained in the data storage component PROTMASK 21e and to logically AND the value with the retrieved content. The result is compared to the value contained in PROTID 21f in a step 53.

If a match is found, the ALU 24 is then controlled, in a step 55, to add the value K provided by the instruction decoder 22 with the address contained in the source register $R_m$, to obtain yet a third address where the data to be read is located. The datum is accessed and stored in the destination register $R_n$ as indicated in FIG. 5A.

If the comparison from step 53 does not result in a match, then the ALU 24 is controlled, in a step 54, to trigger an exception by asserting the control signal 24a. The control signal is provided to the control logic 23. According to a particular implementation of the invention, the control logic is configured to assert further control signals in response to the control signal 24a in order to control the ALU 24 retrieve the value contained in the data storage component VBR 21g and to add the value with a constant value supplied by the control logic to produce an address. The address is then loaded into the program counter 21c and execution resumes at that address.

It can be appreciated from the foregoing, that the "protected" aspect of this read operation arises from the operations involving the PROTMASK 21e and the PROTID 21f. One of ordinary skill will readily appreciate that the processing performed in step 54 amounts to an operation sometimes referred to as a vectored interrupt. The VBR register 21g represents a pointer to a table of addresses (interrupt vector table). It is understood and appreciated by those of ordinary skill in the art that the vector table contents are typically defined by the application, whether dynamically or at boot up. In the case of a read violation with the PMOV command, the constant value provided by the control logic 23 represents a particular entry in the vector table associated with this particular read violation. It can be appreciated that this constant value can be programmable, and initialized at boot up or dynamically updated (e.g., from memory) instead of being hard-coded in the control logic 23.

Figure 7:
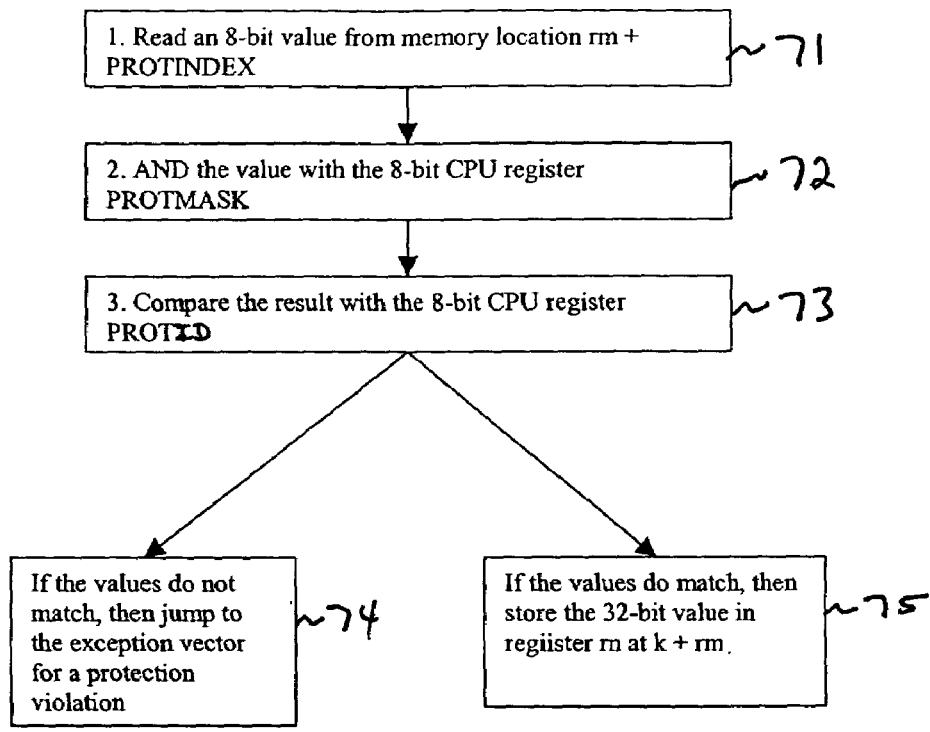
FIGS. 7 and 7A show an embodiment of a write access operation in accordance with the present invention.
Figure 7A:
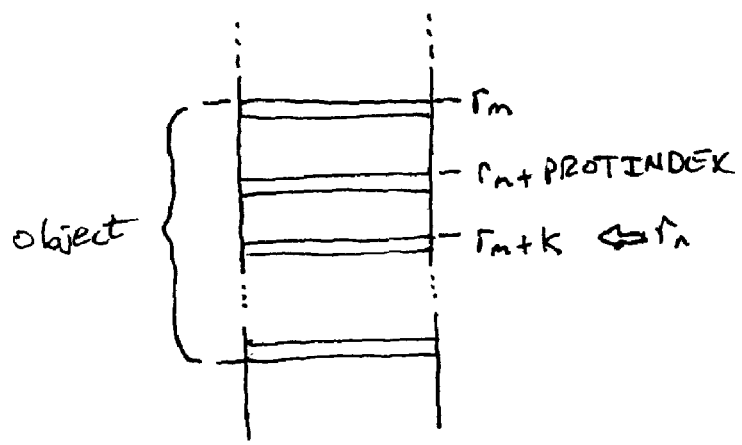

FIGS. 7, 7A, and 6 illustrate a particular embodiment for writing data in accordance with the present invention. FIG. 7 highlights the control sequence for effecting a protected write operation according to the invention. FIG. 6 highlights (with heavy lines) the components of the data processing unit 10 shown in FIG. 2 that participate in the write operation. FIG. 7A illustrates schematically the operation of the PMOV instruction on an object.

An instruction exemplar in accordance with this aspect of the invention can be represented by the following assembly code formatted instruction:

PMOV .L $R_n$, @(K, $R_m$)

where:

PMOV is a mnemonic for the data transfer instruction;

.L is indicative of the size (or number) of data elements (e.g., bytes) to be transferred;

$R_m$ points to the object to be written to (FIG. 7A);

(K, $R_n$) K represents a location in the object and register $R_n$ is a source; and the @ sign is conventional notation for indirect addressing.

It is noted here, as in the case of the read operation above, that this instruction exemplar is merely illustrative and is useful for explaining this aspect of the invention. However, one of ordinary skill in the relevant art will readily appreciate that there are myriad possible variations of the instruction. For example, the data size can be specified differently. The amount of data involved in the transfer can be any appropriate size; e.g., the ".L" qualifier typically specifies the number of bytes to be transferred. Other qualifiers such as ".B", ".W", and so on can be provided. More generally, a PMOV instruction can be provided which performs block-level transfers (e.g., 256 bytes), if desired.

In this particular embodiment of this aspect of the invention, the same mnemonic, PMOV, is used for read operations and write operations. Therefore, in order to distinguish between the two operations, the syntax for specifying the operands is different between read operations and write operations. This allows an assembler to make the distinction and to produce the proper opcodes to represent either a read operation or a write operation. It can be appreciated that separate mnemonics can be used, one for read and another for write. Alternatively, a different syntax convention can be used.

When the instruction decoder 22 decodes a PMOV instruction, signals corresponding to the decoded instruction are provided to the control logic 23 to effect the write operation. In a particular embodiment of this aspect of the invention, the control logic 23 is configured to assert control signals to perform the sequence of actions shown in FIG. 7. First, in a step 71, the ALU 24 is controlled to fetch the value contained in the register $R_m$ (i.e., a pointer to the object) and the value contained in the data storage component PROTINDEX 21d, and to add the two values to obtain a second address. The second address is provided to the MMU 25, where it may be translated into another address. The address provided by the MMU is then used to retrieve the content contained in the addressed memory location. In the particular embodiment of this aspect of the invention, the content retrieved is an 8-bit value which is provided to the ALU 24.

In a step 72, the ALU 24 is then controlled to fetch the value contained in the data storage component PROTMASK 21e and to logically AND the value with the retrieved content. The result is compared to the value contained in PROTID 21f in a step 73.

If a match is found, the ALU 24 is then controlled, in a step 75, to add the value K provided by the instruction decoder 22 with the content of the register $R_m$, to obtain a computed address indicating the area in memory (i.e., in the object) to which data associated with the write operation will be written. The control logic 23 then asserts control signals to perform a write operation of data contained in the source register $R_n$ to the area in memory indicated by the computed address, as illustrated in FIG. 7A. It can be appreciated that the source register $R_n$ can contain the data (e.g., comprising one or more bytes) to be written, or it can point to an location in memory of the source data. Alternatively the source register can represent a beginning address in memory of a block of data to be written into the object.

If the comparison from step 73 does not result in a match, then the ALU 24 is controlled, in a step 74, to trigger an exception by asserting the control signal 24a. The control signal is provided to the control logic 23. According to a particular implementation of the invention, the control logic is configured to assert further control signals in response to the control signal 24a in order to control the ALU 24 retrieve the value contained in the data storage component VBR 21g and to add the value with a constant value supplied by the control logic to produce an address. The address is then loaded into the program counter 21c and execution resumes at that address.

It can be appreciated from the foregoing, that the "protected" aspect of the write operation arises from the operations involving the PROTMASK 21e and the PROTID 21f. One of ordinary skill will readily appreciate that the processing performed in step 74 amounts to an operation sometimes referred to as a vectored interrupt. As discussed above, the VBR register 21g represents a pointer to a table of addresses (interrupt vector table). In the case of a write violation with the PMOV command, the constant value provided by the control logic 23 represents a particular entry in the vector table associated with this particular write violation. The constant value can be the same as that for the read violation, or not. It can be further appreciated that this constant value can be programmable, and initialized at boot up or dynamically updated (e.g., from memory) instead of being hard-coded in the control logic 23.

Figure 8:
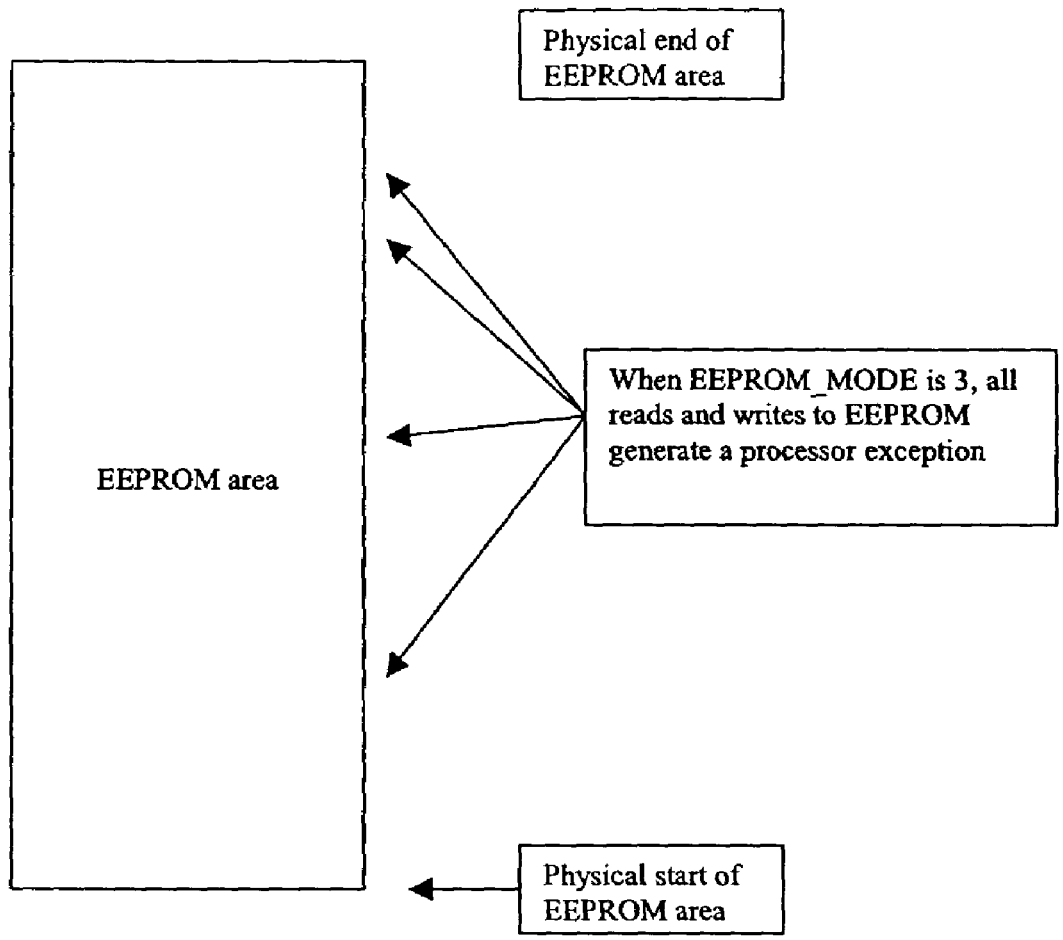

Referring now to FIGS. 8-13, an illustrative embodiment of a memory access method in accordance with an aspect of invention is described. The data processing unit 10 further comprises an EEPROM_MODE data storage component 21h. The content of this register indicates an access mode for the EEPROM memory 26. For example, as illustrated in FIG. 8, an EEPROM_MODE value of "3" can be used to indicate that all read and write accesses to the EEPROM memory space will generate an exception and be handled by an exception handler in a manner to be discussed shortly. It can be appreciated that in other embodiments of this aspect of the invention, the EEPROM_MODE register 21h can be implemented anywhere in the data processing unit 10 that is convenient. For example, the data store can be provided in the EEPROM controller 27.

Figure 9:
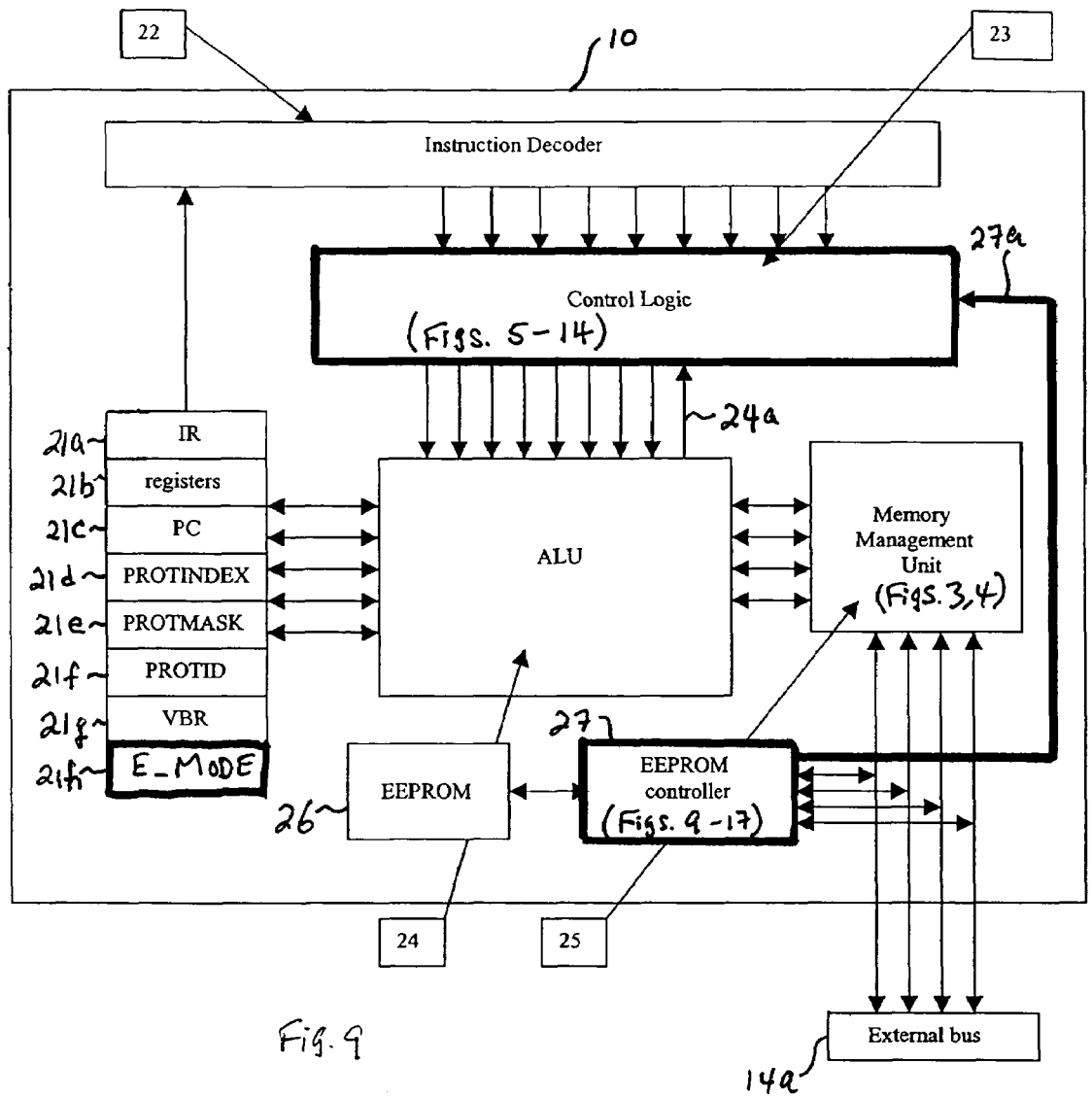

FIG. 9 highlights with heavy lines the components of the data processing unit 10 illustrated in FIG. 2 involved in generating an EEPROM access exception. An instruction fetched in the instruction register 21a is decoded by the instruction decoder 22. Suitable control signals produced by the decoded instruction are provided to the control logic 23. The ALU 24 is then controlled according to control signals asserted by the control logic and provided to the ALU. If a memory reference is made, an address is determined by the ALU from the operand(s) of the instruction and provided to the MMU 25. In accordance with a particular embodiment of the invention the EEPROM controller 27 is configured to recognize the address space associated with the EEPROM memory. The EEPROM controller is further configured to check the value in the EEPROM_MODE register 21h when it recognizes an address as being an EEPROM address. If the EEPROM_MODE is "3", then the EEPROM controller can be configured to assert the control signal 27a which is provided to the control logic 23. Appropriate exception handling (e.g., such as described in connection with VBR register 21g), can be performed by the control logic to continue execution in an appropriate exception handler.

The illustrative embodiment shown in FIG. 9 indicates that for EEPROM_MODE "3," the EEPROM controller 27 is configured to trigger the control signal 27a on an address that falls within the full range of the EEPROM address space. It can be appreciated of course that the controller can be configured to trigger the control signal on subset of addresses in the EEPROM address space. This can include recognizing an address within one or more predefined (or programmably definable) address ranges. It can be understood that suitable data storage components (e.g., registers) can be provided to implement multiple address ranges.

FIG. 10 illustrates a caching method in accordance with the present invention. An application 101 is shown performing I/O operations with an EEPROM memory 103, or some other similar re-programmable, non-volatile memory. A caching mechanism 102 provides a caching function of all I/O operations. In accordance with this aspect of the present invention, the caching mechanism caches write operations in addition to read operations. In a particular embodiment of this aspect of the invention, the caching mechanism as shown in the figure is implemented as an exception handler routine and uses RAM as a cache memory.

FIG. 11 illustrates a further aspect of the caching method of the present invention. An application 111 performs I/O with an EEPROM memory 113, or some other similar re-programmable, non-volatile memory. In accordance with this aspect of the present invention, the cache mechanism 112 caches (to a "write" cache, not expressly shown) only write operations to the EEPROM memory. Read operations are performed directly from the EEPROM; with the exception that memory locations updated by cached write operations are read based on the content of the "write" cache. In a particular embodiment of this aspect of the invention, the caching mechanism is implemented as an exception handler routine, and the "write" cache is provided by RAM.

Referring again for a moment to FIG. 9, it can be appreciated the upon detecting the control signal 27a, the control logic 23 can be configured, in a particular embodiment of the present invention, to effect the caching operations shown in FIG. 10 or in FIG. 11. In one particular implementation, the data processing unit 10 can include hard-wired logic to perform the caching operations. Alternatively, the control logic 23 in response to the control signal 27a can perform exception handling and transfer execution to an exception handler routine.

Figure 12:
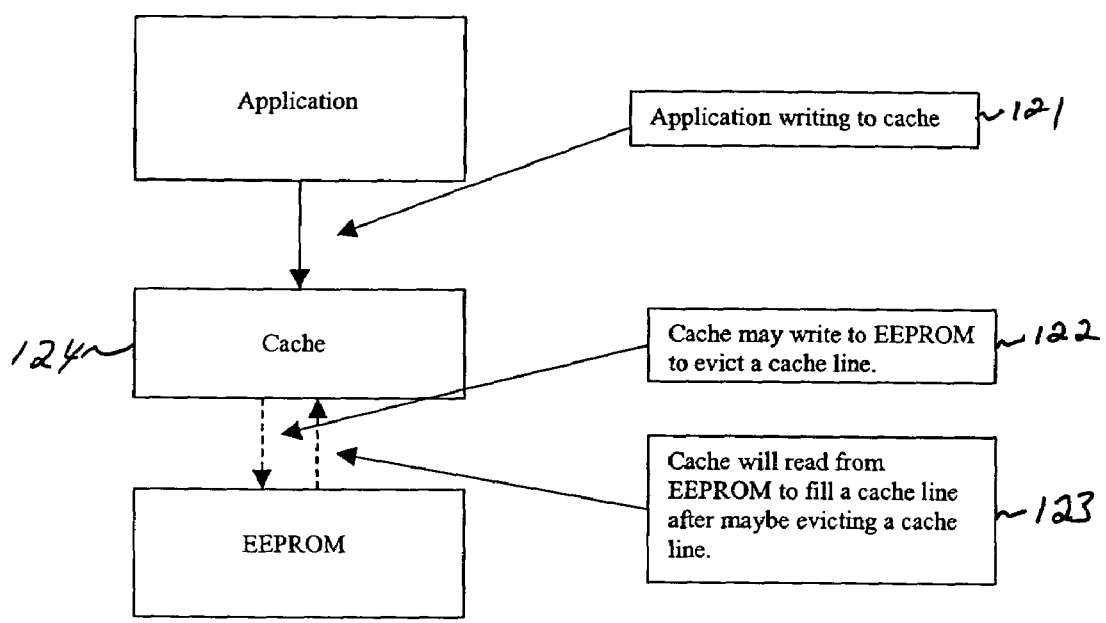

FIG. 12 illustrates processing during a "write" cache operation according to an embodiment of this aspect of the invention. As described in FIG. 9, a write operation 123 to the EEPROM memory 26 by an application can be detected. The cache 124 may have to make space or "evict" other cached memory, operation 122, in order to store the data to be cached. In this aspect of the invention, the data is write data associated with a write operation to an EEPROM memory or other similar re-programmable, non-volatile memory. It can be appreciated that the cache 124 shown in the figure is representative of the cache processing and the cache memory. For example, in a particular embodiment, the cache processing can be a software routine access via an exception. The cache memory can be the RAM memory 12 itself. It is worth noting that in a conventional caching scheme, a high speed cache memory is used to improve the read access of the RAM. It is ironic therefore that, in this particular embodiment of this aspect of the invention, the RAM serves the role of a cache memory.

Typically, caches are organized into a number of cache lines, where each cache line holds a specific number of consecutive bytes of memory (referred to as the cache line size). Caches typically organize multiple cache lines into groups based on a simple mapping function; e.g., a hashing algorithm such as address bit hashing. Consequently, the data to be cached can only be stored in a cache line falling into the cache line group as determined by the mapping function. If no cache line is available in that group (cache miss), the cache must evict a cache line out of that group. The organization and eviction mechanisms are standard practice in current cache deployment and, in accordance with an aspect of the present invention, are adapted for the "write" cache. For example, evicting a cache line in accordance with an embodiment of the invention includes performing a write operation to the area in the EEPROM memory to effect write the operation. This then frees up a cache line in the cache to store the data to be cached. The question of when to perform a write operation to the EEPROM can be answered using policies conventionally employed for read caches.

If data needs to be cached (in memory 124) from the EEPROM, a similar process 123 of finding an available cache line to hold the data is performed. If this location is presently occupied by a valid data item, then the present contents of the cache line must be "evicted" and written to EEPROM so the data will not be lost prior to filling the cache line with new data. If the cache line presently holds no data, then the cache line can be filled with the new data with no prior preparation. So, there is an eviction process which may or may not be necessary prior to filling the cache line, depending on whether it was or was not holding valid data.

Figure 13:
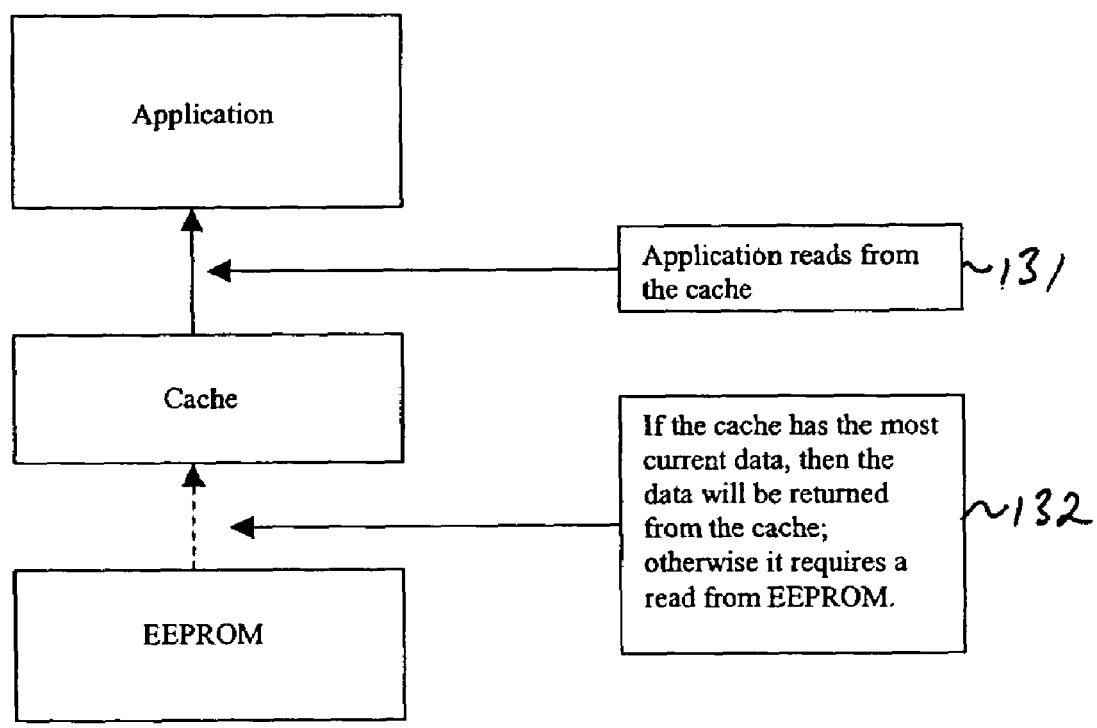

FIG. 13 illustrates processing during a "read" operation to the EEPROM memory 26. In one aspect of the invention, the read can be satisfied from the cache, operation 132, if it has the most current "written" data. Otherwise, a read from the EEPROM is performed, operation 132. As indicated in FIG. 10, however, another aspect of the invention provides conventional read caching, in addition to "write" caching. With respect to FIG. 13, then, the additional caching of read operations may impose a heavier burden on the cache mechanism. On the other hand, it may improve read operation throughput. Whether the caching function provides for caching read operations is a matter of design choice based on considerations not relevant to the practice of the present invention.

Figure 14:
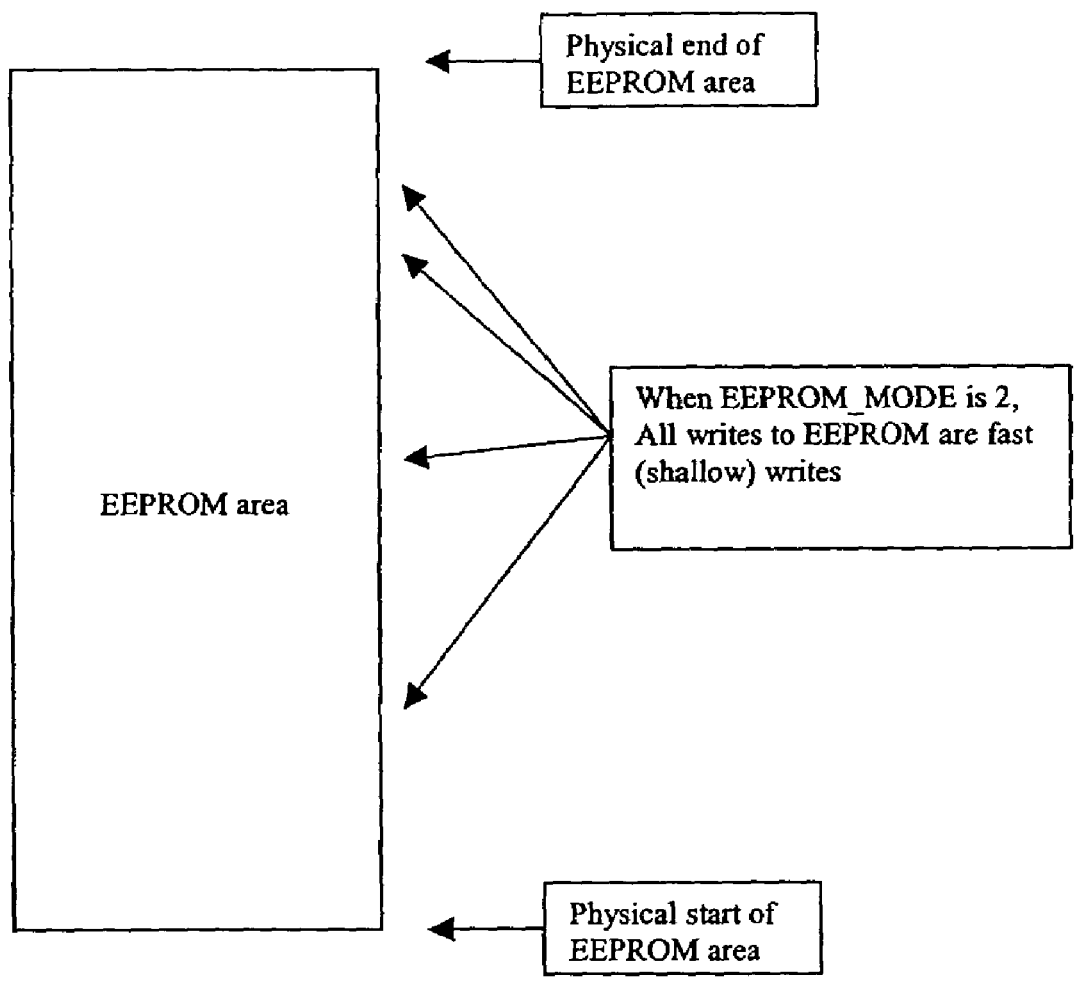
FIGS. 14 and 15 illustrate an embodiment of a write operation in accordance with the present invention.
Figure 15:
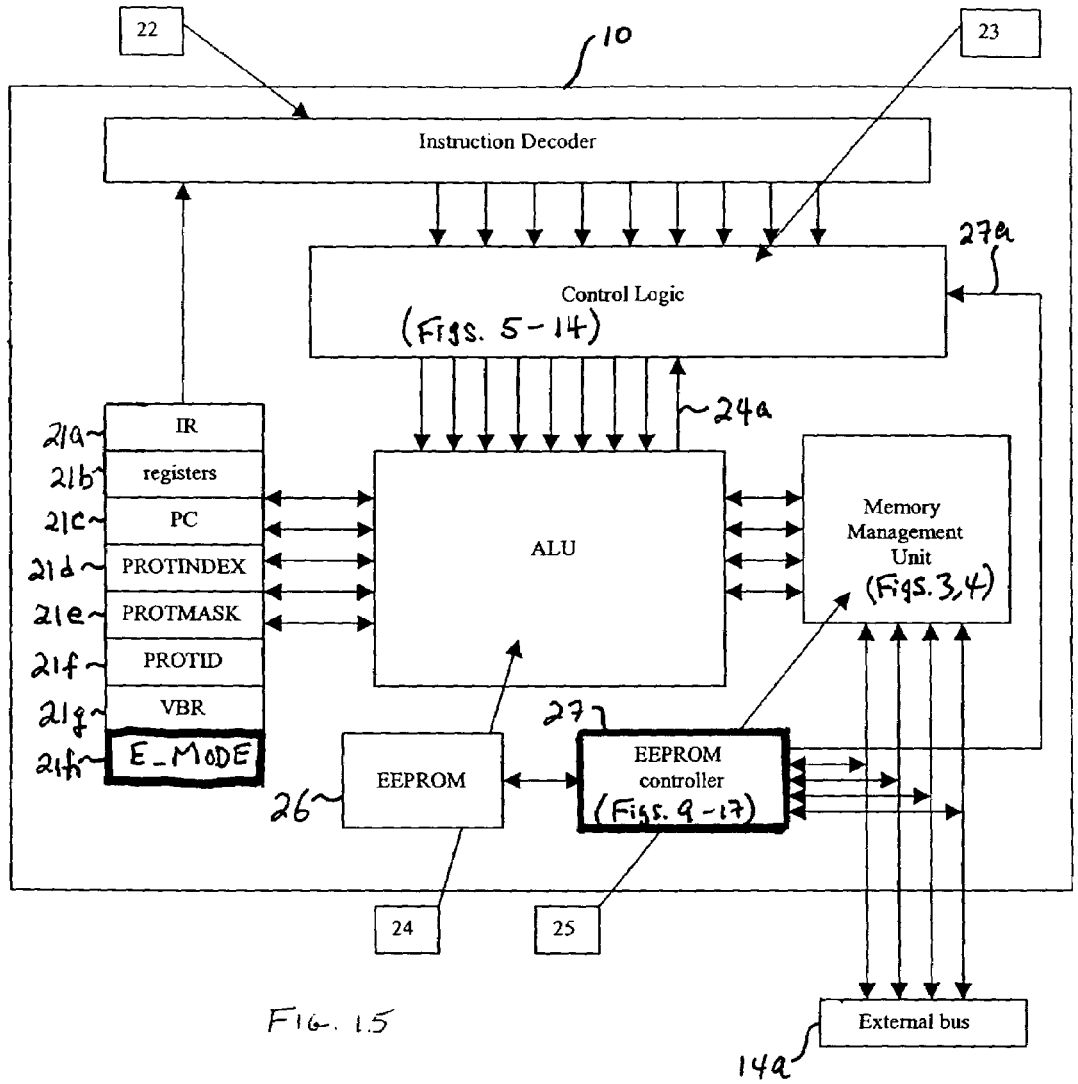
Figure 16:
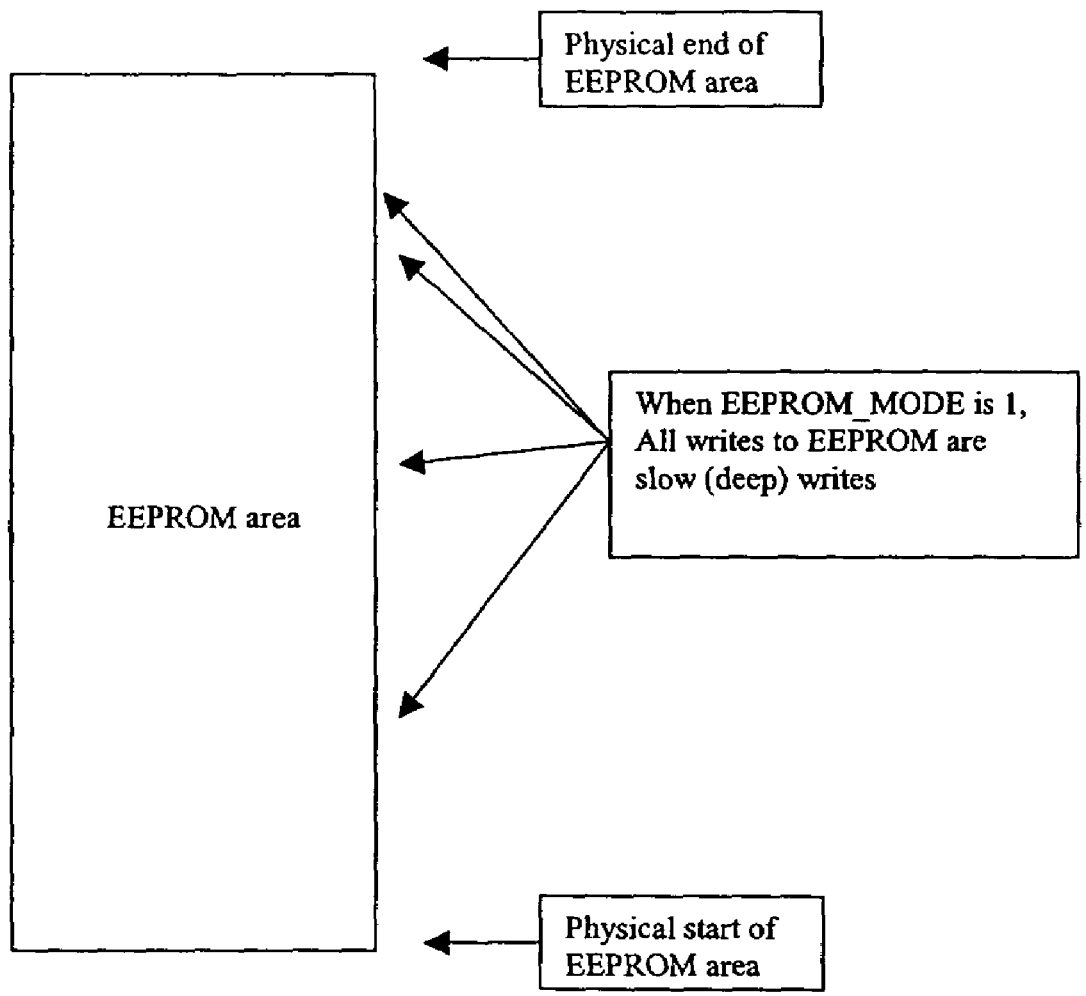
FIGS. 16 and 17 show additional aspects of the write operation of the present invention.
Figure 18:
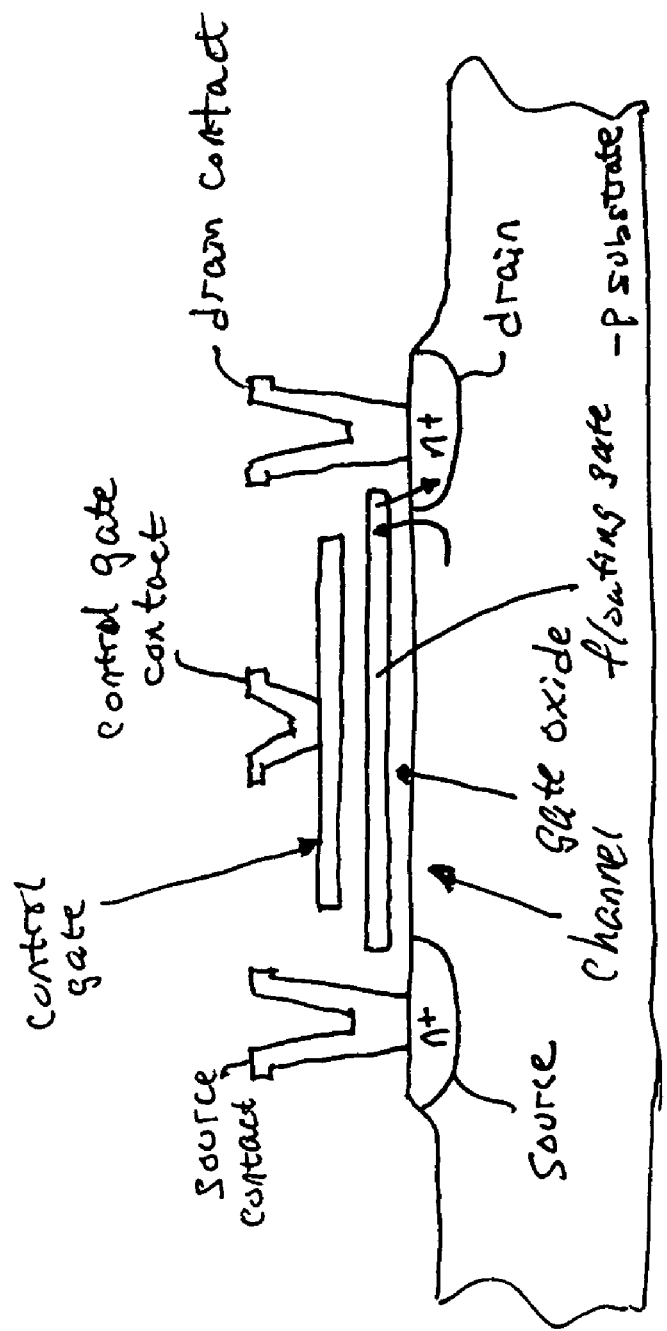
FIG. 18 is a schematic representation of a typical re-programmable, non-volatile memory cell.

FIGS. 14-16 illustrate example embodiments of a method for writing to EEPROM memory 26, or to other similar re-programmable, non-volatile memory. Refer for a moment to FIG. 18 which shows the construction of a typical reprogrammable, non-volatile memory cell (e.g., EEPROM, flash memory). The figure schematically illustrates the process of the floating gate being loaded (programmed) with electrons during programming operation. The figure shows diagrammatically the flow of electrons from the channel region, across the gate oxide, and into the floating gate structure, where the electrons are stored. The also shows the process of electron tunneling to unload (erase) electrons from the floating gate. By a tunneling effect, the electrons tunnel from the floating gate structure into the $n^+$well of the drain.

Referring to FIGS. 14 and 15, an aspect of the invention provides for increased write times (fast write operations, shallow write operations, non-persistent writes) to an EEPROM memory 26 (FIG. 2), or other similar re-programmable, non-volatile memory.

Recall from FIG. 3 that the EEPROM_MODE register 21h indicates an access mode for the EEPROM memory. Thus, as an embodiment of this aspect of the present invention, an EEPROM_MODE value (say, "2") can be used to indicate that all write operations to the EEPROM memory are performed using "fast writes." Thus, when the EEPROM controller 27 detects a write operation to the EEPROM memory 26, the EEPROM_MODE register is consulted to determine whether mode "2" is selected. The elements of the data processing unit 10 involved in this activity are highlighted in FIG. 15 in heavy lines.

In one implementation, a fast write operation comprises performing a write cycle on the EEPROM for a duration that is less than the specified write cycle time recommended by the manufacturer of the particular EEPROM device being used. Typically, the logic and support circuitry for programming the EEPROM can be provided in the EEPROM controller 27. However, the programming components can be provided outside of the data processing unit 10 and controlled by the EEPROM controller via suitable control lines on the bus 14 (FIG. 1).

It is understood of course, that a fast write operation will result in data that will have a shorter retention time than data retention times from performing a full write cycle. However, in a particular application, a decreased retention time may be acceptable. In the case of a virtual machine such as the Java VM in a Javacard environment, a fast write operation of EEPROM in accordance with the present invention may provide a practical solution to the limited RAM capacity that is typical in such environments. EEPROM capacity is typically greater than RAM availability in a Javacard. Long term EEPROM retention is not needed in a situation where a VM applet is going to run once and thus only needs access to memory long enough to do its thing. The fast write operation of the present invention can therefore provide a VM applet with the memory space it needs to execute.

Another EEPROM memory access mode, mode "1" say, is provided. In this mode, all EEPROM writes are performed using standard write cycle times recommended by the manufacturer of the EEPROM device ("slow" writes, deep writes, persistent writes). In accordance with the invention, it is possible to change the EEPROM access mode dynamically to permit fast writes or slow writes as needed for any given instance. Mode "1" access comprises performing all write operations using a slow write. See FIG. 16.

Figure 17:
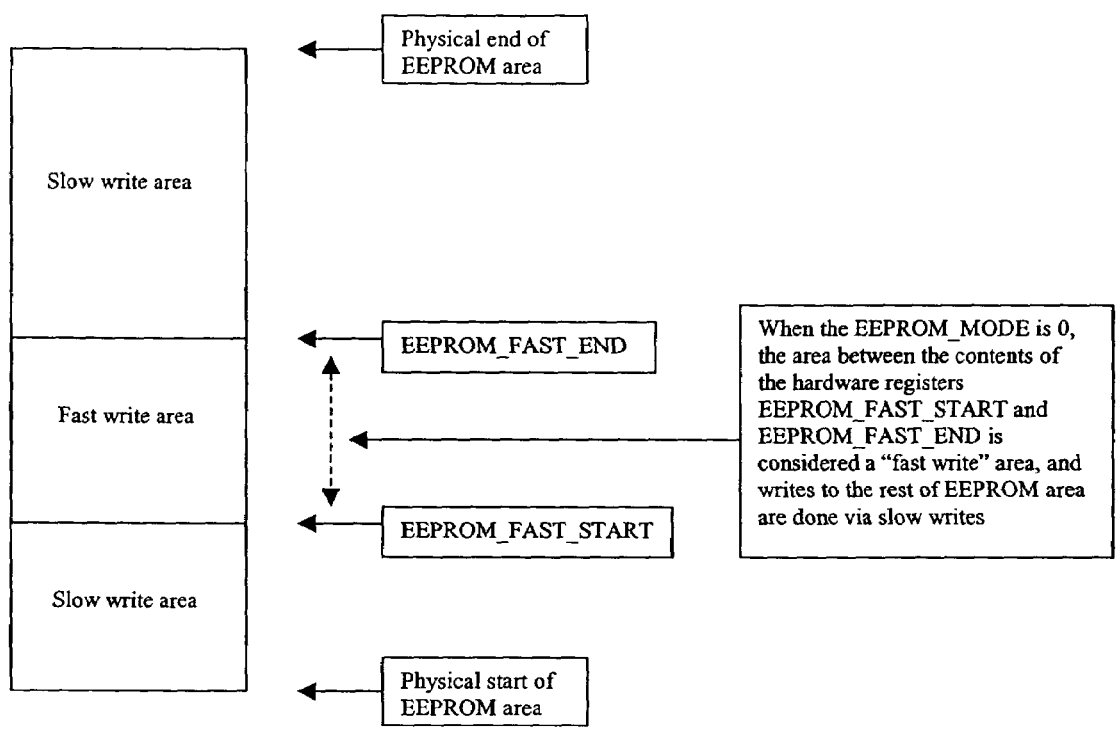

In accordance with an aspect of the invention, fast and slow write operations can be performed depending on the address location. Thus, still another EEPROM memory access mode, mode "0" say, is provided. FIG. 17 illustrates a particular embodiment of this aspect of the invention. An address range EEPROM_FAST_END to EEPROMM_FAST_START is defined. In this particular embodiment, the EEPROM controller 27 is configured to recognize this range of addresses and to perform fast write operations when the addressed memory location falls within the range. Write operations for EEPROM addresses outside of this range are performed with slow write operations. In a particular implementation, the address range can be stored in registers (or some such data storage component) provided in the data processing unit 10; e.g., in the EEPROM controller 27. The address range can be hardwired values, or can be modifiable.

In another embodiment of this aspect of the invention, the EEPROM address space can be partitioned into a plurality of segment of equal or unequal sizes. Each segment can be identified as being a fast-write segment or a slow-write segment. Register or similar data storage components can be provided to identify the address ranges of each segment. Another register can be used to indicate the write-mode (fast, slow) for each segment. The EEPROM controller 27 can access the information in these registers to determine which write mode to apply for a given write operation.

Further according to the invention, the foregoing EEPROM memory access modes can be selectable at run time. Thus, a particular embodiment of a microprocessor according to the invention can provide one, two, or all three modes of operation. If two or more memory access modes are provided, each access mode can be selectable at run time. Suitable control (e.g., software) can be provided which writes an appropriate EEPROM_MODE value into the register 21h (FIG. 2). Each application can thereby determine which EEPROM memory access policy it desires to use. In addition, the access mode can even be changed within an application whenever the application deems it is appropriate to do so.

In another embodiment of the invention mode "3" operation (caching) can be combined with operation modes 2-0. Thus, a microprocessor according to this aspect of the invention can provide multiple runtime modes of operation where an application executing on the microprocessor can dynamically switch among all the EEPROM modes of operation.

What is claimed is:

1. A memory access method comprising:
   detecting a write operation to a non-volatile memory;
   determining an access mode of said non-volatile memory corresponding to a value in a mode register for controlling said non-volatile memory
   performing a fast write operation of data to said non-volatile memory in response to a determined access mode that is a first mode;
   performing a slow write operation of data to said non-volatile memory, in response to a determined access mode that is a second mode;
   responding to a determined access mode that is a third mode by performing a write operation such that:
      if an address of said non-volatile memory from a processing logic indicates a write operation to a first address area, then said non-volatile memory write operation is executed according to said fast write operation of data,
      if an address of said non-volatile memory does not indicate a write operation to the first address area, then said non-volatile memory write operation is executed according to said slow write operation of data; and
   performing a cache write operation of data to a cache memory comprised of a random access memory based on an exception handler routine in response to a determined access mode that is a fourth mode.

2. A memory access method, according to claim 1, wherein if a cache line of said cache memory contains cache line data other than the data to be written in said cache write operation of said data, said cache line data is written to said non-volatile memory and said data is written to said cache line of said cache memory.

3. A memory access method, according to claim 1, wherein said mode register indicates an access mode for said non-volatile memory.

4. A memory access method, according to claim 2, wherein said slow write operation has a predetermined write time to said non-volatile memory; and
wherein said fast write operation has a write time shorter than said predetermined time of said slow write time.

5. A memory access method according to claim 1, wherein said first address area and said second address area is indicated in a register.

6. A data processing unit comprising:
   memory that includes re-programmable non-volatile memory into which data is written; and
   control logic that detects a write operation to a non-volatile memory, determines an access mode of said non-volatile memory corresponding to a value in a mode register for controlling said non-volatile memory, performs a fast write operation of data to said non-volatile memory in response to a determined access mode that is a first mode, performs a slow write operation of data to said non-volatile memory, in response to a determined access mode that is a second mode, responds to a determined access mode that is a third mode by performing a write operation such that:
      if an address of said non-volatile memory from a processing logic indicates a write operation to a first address area, then said non-volatile memory write operation is executed according to said fast write operation of data,
      if an address of said non-volatile memory does not indicate a write operation to the first address area, then said non-volatile memory write operation is executed according to said slow write operation of data, and
   performs a cache write operation of data to a cache memory comprised of a random access memory based on an exception handler routine in response to a determined access mode that is a fourth mode.

7. A data processing unit according to claim 6, wherein if a cache line of said cache memory contains cache line data other than the data to be written in said cache write operation of said data, said cache line data is written to said non-volatile memory and said data is written to said cache line of said cache memory.

8. A data processing unit according to claim 6, wherein said mode register indicates an access mode for said non-volatile memory.

9. A data processing unit according to claim 7, wherein said slow write operation has a predetermined write time to said non-volatile memory; and
wherein said fast write operation has a write time shorter than said predetermined time of said slow write time.

10. A data processing unit according to claim 6, wherein said first address area and said second address area are indicated in a register.

* * * * *